US007979685B1

(12) United States Patent
de Jong et al.

(10) Patent No.: US 7,979,685 B1
(45) Date of Patent: Jul. 12, 2011

(54) MULTIPLE INSTRUCTION EXECUTION MODE RESOURCE-CONSTRAINED DEVICE

(75) Inventors: Eduard K. de Jong, Bristol (GB); Jurjen N.E. Bos, Heemskerk (NL)

(73) Assignee: Oracle America, Inc., Redwood City, CA (US)

( * ) Notice: Subject to any disclaimer, the term of this patent is extended or adjusted under 35 U.S.C. 154(b) by 654 days.

(21) Appl. No.: 11/998,054

(22) Filed: Nov. 27, 2007

(51) Int. Cl.
*G06F 9/00* (2006.01)

(52) U.S. Cl. ........................ 712/229; 712/202
(58) Field of Classification Search .................. None
See application file for complete search history.

(56) References Cited

U.S. PATENT DOCUMENTS

| | | | |
|---|---|---|---|
| 5,542,059 A * | 7/1996 | Blomgren ................ | 712/41 |
| 5,598,546 A * | 1/1997 | Blomgren ................ | 712/209 |
| 5,634,046 A * | 5/1997 | Chatterjee et al. ........... | 712/227 |
| 5,638,525 A * | 6/1997 | Hammond et al. .......... | 712/209 |
| 5,781,457 A * | 7/1998 | Cohen et al. ................. | 708/231 |
| 5,781,750 A * | 7/1998 | Blomgren et al. ........... | 712/209 |
| 5,802,519 A | 9/1998 | De Jong ...................... | 707/100 |
| 5,805,918 A * | 9/1998 | Blomgren et al. ............ | 712/43 |
| 5,884,057 A * | 3/1999 | Blomgren et al. ........... | 712/204 |
| 5,925,123 A * | 7/1999 | Tremblay et al. ............ | 712/212 |
| 5,930,363 A | 7/1999 | Stanford et al. ............... | 380/24 |
| 6,052,690 A | 4/2000 | de Jong ....................... | 707/101 |
| 6,094,656 A | 7/2000 | De Jong ...................... | 707/100 |
| 6,219,783 B1 * | 4/2001 | Zahir et al. ................... | 712/228 |
| 7,134,119 B2 * | 11/2006 | Nevill .......................... | 717/139 |
| 7,647,489 B2 * | 1/2010 | Butcher ....................... | 712/242 |
| 2002/0099933 A1 * | 7/2002 | Nevill et al. ................. | 712/228 |
| 2002/0108103 A1 * | 8/2002 | Nevill .......................... | 717/139 |
| 2004/0003214 A1 * | 1/2004 | Sunayama et al. ........... | 712/234 |
| 2004/0190330 A1 * | 9/2004 | Iwata ........................... | 365/149 |
| 2005/0240915 A1 * | 10/2005 | Patel ............................ | 717/148 |
| 2005/0268301 A1 * | 12/2005 | Kelley et al. ................. | 718/100 |
| 2006/0236077 A1 * | 10/2006 | Strom et al. ................. | 712/209 |
| 2007/0079283 A1 * | 4/2007 | Kuninobu et al. ........... | 717/106 |
| 2007/0083745 A1 * | 4/2007 | Iwata ............................ | 713/1 |
| 2007/0094482 A1 * | 4/2007 | Jensen et al. ................. | 712/209 |
| 2007/0288909 A1 * | 12/2007 | Cheung et al. ............... | 717/136 |
| 2008/0126728 A1 * | 5/2008 | Fernald ........................ | 711/163 |

* cited by examiner

*Primary Examiner* — Idriss N Alrobaye
(74) *Attorney, Agent, or Firm* — Gunnison, McKay & Hodgson, L.L.P.; Forrest Gunnison

(57) ABSTRACT

A resource-constrained device comprises a processor configured to execute multiple instruction streams comprising multiple instructions having an opcode and zero or more operands. Each of the multiple instruction streams is associated with one of multiple instruction execution modes having an instruction set comprising multiple instruction implementations. At least one of the multiple instruction implementations is configured to change the processor from a first instruction execution mode to a second instruction execution mode. The processor comprises an instruction fetcher configured to fetch an instruction from one of the multiple instruction streams based at least in part upon a current instruction execution mode.

16 Claims, 28 Drawing Sheets

| "Pre-Jump" Instructions(s) | "Jump To" Address |
|---|---|
|  |  |
|  |  |
|  |  |
|  |  |

. . .

Unrestricted Entry Points Table

FIG. 3

MULTIPLE INSTRUCTION EXECUTION MODE RESOURCE-CONSTRAINED DEVICE

FIELD OF THE INVENTION

The present invention relates generally to the field of computer science, and more particularly to a multiple instruction execution mode resource-constrained device.

BACKGROUND OF THE INVENTION

FIG. 1A is a block diagram that illustrates a resource-rich device. Resource-rich devices 110 are generally considered those that are relatively unrestricted in memory and/or computing power or speed and have a single execution mode 115. A typical desktop computer is an example of a resource-rich device. A resource-rich device 100 may allow multiple independent execution modes 105 that allow multiple code spaces with programs that execute with different privileges. A kernel or secure execution mode is associated with relatively more privileges, allowing application programmers relatively more freedom in using the code space. An application or unsecure execution mode is associated with relatively less privileges, allowing application programmers relatively less freedom in using the code space.

FIG. 1B is a block diagram that illustrates a resource-constrained device. Resource-constrained devices 110 are generally considered to be those that are relatively restricted in memory and/or computing power or speed, as compared to typical desktop computers (reference numeral 100 of FIG. 1A) and the like. Resource-constrained devices include, by way of example, smart cards, cellular telephones, boundary scan devices, field programmable devices, personal digital assistants (PDAs) and pagers and other miniature or small footprint devices.

Smart cards, also known as intelligent portable data-carrying cards, are a type of resource-constrained device. Smart cards are typically made of plastic or metal and have an electronic chip that includes an embedded microprocessor or microcontroller to execute programs and memory to store programs and data. Such devices, which can be about the size of a credit card, typically have computer chips with 8-bit or 16-bit architectures. Additionally, these devices typically have limited memory capacity. For example, some smart cards have less than one kilobyte (1K) of random access memory (RAM) as well as limited read only memory (ROM), and/or non-volatile memory such as electrically erasable programmable read only memory (EEPROM).

A Java™ virtual machine executes programs written in the Java™ programming language and is designed for use on desktop computers, which are relatively rich in memory. It would be desirable to write programs that use the full implementation of the Java™ virtual machine for execution on resource-constrained devices such as smart cards. However, due to the limited architecture and memory of resource-constrained devices such as smart cards, the full Java™ virtual machine platform cannot be implemented on such devices. Accordingly, a separate Java Card™ (the smart card that supports the Java™ programming language) technology supports a subset of the Java™ programming language for resource-constrained devices.

Development of an applet for a resource-constrained device, such as a smart card 110, begins in a manner similar to development of a Java program. In other words, a developer writes one or more Java classes and compiles the source code with a Java compiler to produce one or more class files. The applet can be run, tested and debugged, for example, on a workstation using simulation tools to emulate the environment on the card 110. When the applet is ready to be downloaded to the card 110, the class files are converted to a converted applet (CAP) file by a converter. The converter can be a Java application being executed by a desktop computer.

A smart card 110 has an input/output (I/O) port, which can include a set of contacts through which programs, data and other communications are provided. The card 110 also includes a loader for receiving the contents of the CAP file and preparing the applet for execution on the card 110. The installation tool can be implemented, for example, as a Java program and can be executed on the card 110. The card 110 also has memory, including impersistent mutable memory such as a RAM. The card 110 also has a persistent immutable memory such as a ROM and a mutable persistent memory, such as an EEPROM. The applet prepared by the loader can be stored in the EEPROM. Java Card™ technology is described in Z. Chen, Java Card™ Technology for Smart Cards—Architecture and Application Programmer's Guide, Boston, Addison-Wesley, (2000).

A need exists in the art for a solution that allows a resource-constrained device to execute multiple programs having instructions with separate privileges. A further need exists for such a solution that performs runtime checks. A further need exists for such a solution that obeys memory zoning. A further need exists for such a solution that allows relatively complex operations to be securely expressed in relatively simple instructions.

SUMMARY OF THE INVENTION

A resource-constrained device comprises a processor configured to execute multiple instruction streams comprising multiple instructions having an opcode and zero or more operands. Each of the multiple instruction streams is associated with one of multiple instruction execution modes having an instruction set comprising multiple instruction implementations. At least one of the multiple instruction implementations is configured to change the processor from a first instruction execution mode to a second instruction execution mode. The processor comprises an instruction fetcher configured to fetch an instruction from one of the multiple instruction streams based at least in part upon a current instruction execution mode.

An instruction stream is transformed by receiving the instruction stream including executable code, determining a frequency of use of program units in the instruction stream, ordering the program units within the instruction stream based at least in part on the frequency of use, and recoding program unit call instructions in the instruction stream to use an optimized program unit call instruction to call program units used more frequently. The program unit call instruction includes an opcode and zero or more operands. Coding of the opcode includes a static portion and a dynamic portion. The dynamic portion is for use in accessing an entry within a program unit reference table. The entry is for storing a reference of one of the program units. The ordering and recoding generates a transformed instruction stream, in one embodiment, that is stored on a storage medium for execution on a resource-constrained device.

A method of executing instructions on a resource-constrained device includes fetching a first instruction including a first opcode and zero or more operands. An opcode coding of the first opcode includes a first static portion and a first dynamic portion. The first dynamic portion is used in referencing an unrestricted entry points table entry in an unrestricted entry points table stored in a memory of the resource-constrained device. The unrestricted entry points table entry references a start of an unrestricted program unit in an unrestricted instruction stream stored in a memory of the resource-constrained device. The method also includes executing the first dynamic portion to reference the unrestricted entry points table entry, and executing the unrestricted program unit referenced by the unrestricted entry points table entry. The method further includes fetching a second instruction including a second opcode and zero or more operands. An opcode coding of the second opcode includes a first static portion and a first dynamic portion. The first dynamic portion of the opcode coding of second opcode of the second instruction is used in referencing a start of a restricted program unit in a restricted instruction stream stored in a memory of the resource-constrained device. The first static portion of the opcode coding of the first opcode of and the first static portion of the second opcode coding of the second opcode include a same prefix. The method further includes executing the first dynamic portion of the opcode coding of second opcode to reference the start of the restricted program unit is the restricted instruction stream and executing the restricted program unit on the resource-constrained device.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 3 is a block diagram that illustrates an unrestricted entry points table, in accordance with one embodiment of the present invention.

Figure 1A:
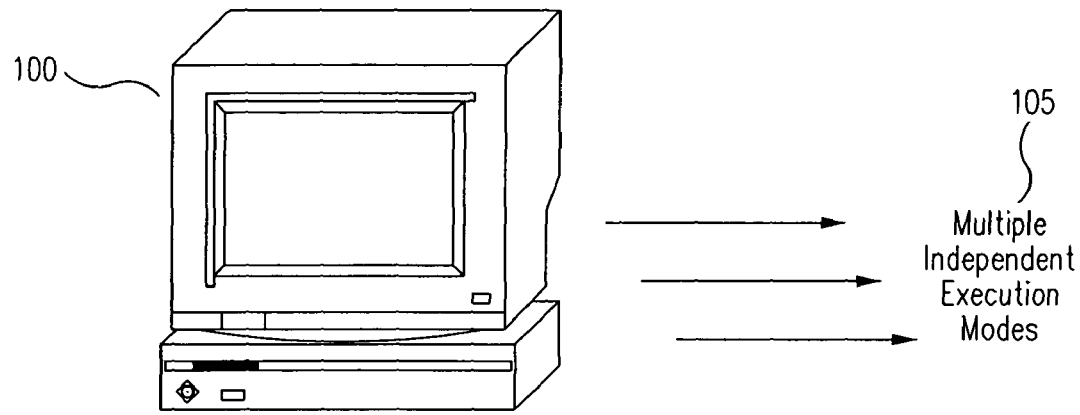
FIG. 1A is a block diagram that illustrates a resource-rich device.
Figure 1B:
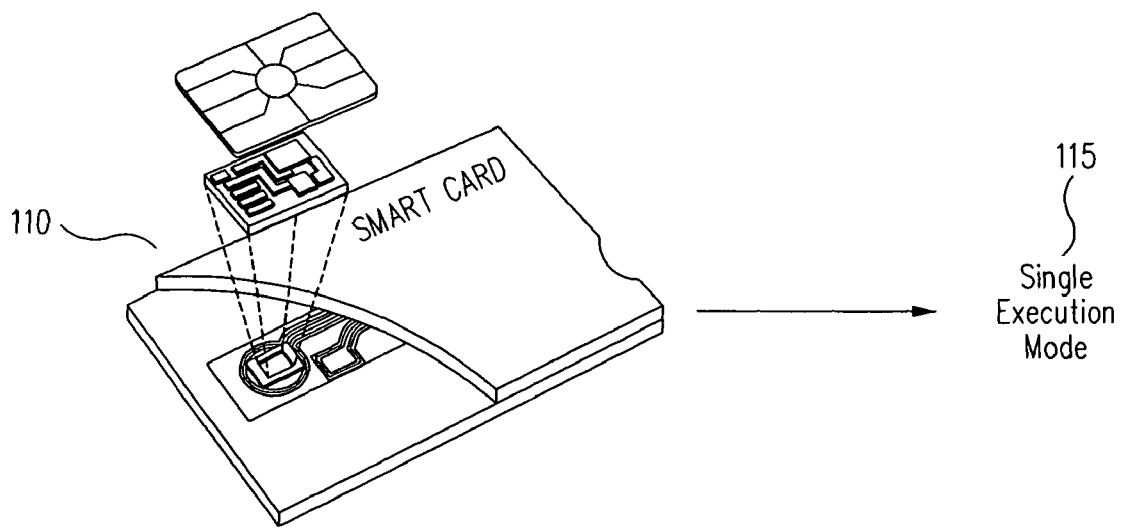
FIG. 1B is a block diagram that illustrates a resource-constrained device.

In the drawings, the first digit of the reference numeral for an element represents the figure number in which that element first appears.

DETAILED DESCRIPTION

Embodiments of the present invention are described herein in the context of a multiple instruction execution mode resource-constrained device. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of this specification, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of this specification, the term "randomized" describes the result of a random or pseudo-random number generation process. A "randomized process" describes the application of such a result to a process. Methods of generating random and pseudo-random numbers are known by those skilled in the relevant art.

In the context of this specification, the term "identifier" describes one or more numbers, characters, symbols, or the like. More generally, an "identifier" describes any entity that can be represented by one or more bits.

In the context of this specification, the term "instruction" describes an opcode and zero or more associated operands.

In the context of this specification, the term "instruction implementation" describes executable code that implements an instruction.

In the context of this specification, the term "instruction set" describes one or more instruction implementations configured for execution in a particular instruction execution mode.

In the context of this specification, the term "instruction reference" describes a reference to an instruction.

In the context of this specification, the term "instruction stream" describes a sequence of one or more instructions. The one or more instructions may be collocated, and they may be stored in a memory.

In the context of this specification, a restricted instruction implementation has relatively less privileges with respect to an unrestricted instruction implementation. Likewise, an unrestricted instruction implementation has relatively more privileges with respect to a restricted instruction implementation. By way of example, an unrestricted instruction implementation may have greater access to all or part of a memory with respect to a restricted instruction implementation.

Figure 27:
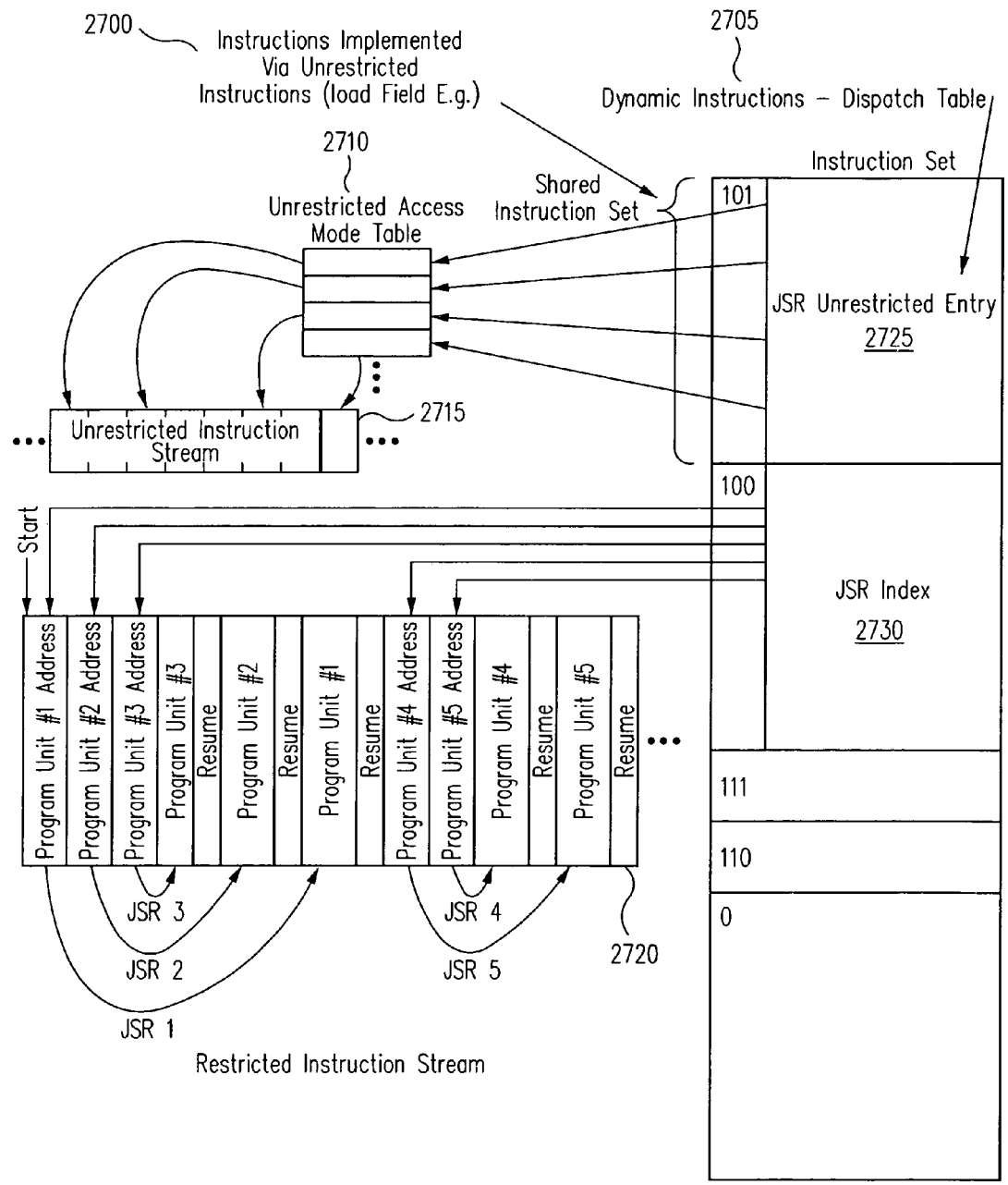
FIG. 27 is a block diagram that illustrates an instruction dispatch table associated with a restricted instruction set comprising one or more dynamic instructions, in accordance with one embodiment of the present invention.
Figure 28:
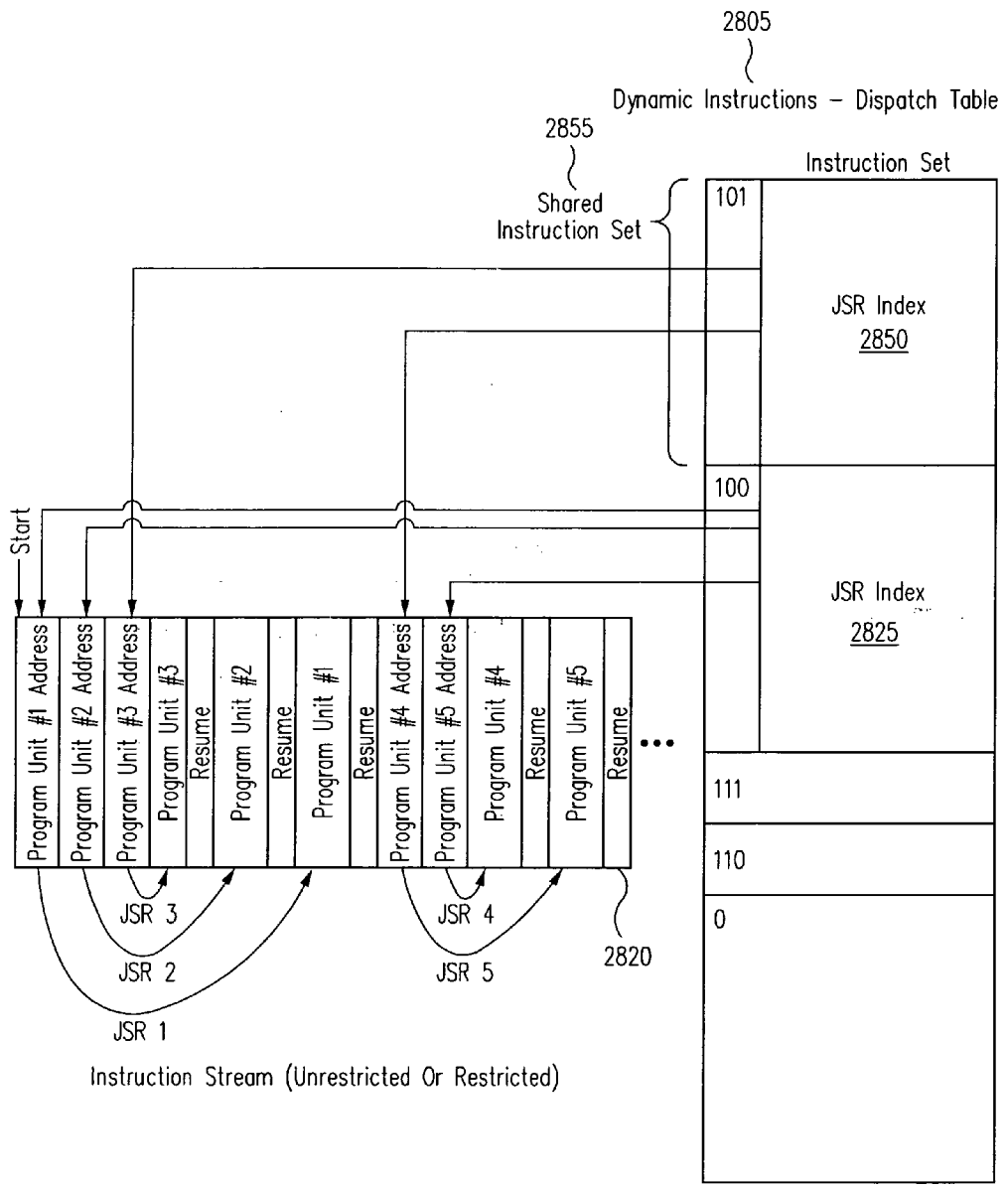
FIG. 28 is a block diagram that illustrates an instruction dispatch table associated with an unrestricted instruction set comprising one or more dynamic instructions, in accordance with one embodiment of the present invention.

FIGS. 2-28 illustrate instruction execution on a resource constrained device configured for multiple instruction execution modes, in accordance with embodiments of the present invention. FIGS. 2-9 illustrate using separate data stacks. FIGS. 12-15 illustrate using a merged data stack. FIGS. 16-21 illustrate using an interleaved data stack. FIGS. 22-26 illustrate using a program unit reference table. FIGS. 27-28 illustrate using an instruction dispatch table.

Figure 2:
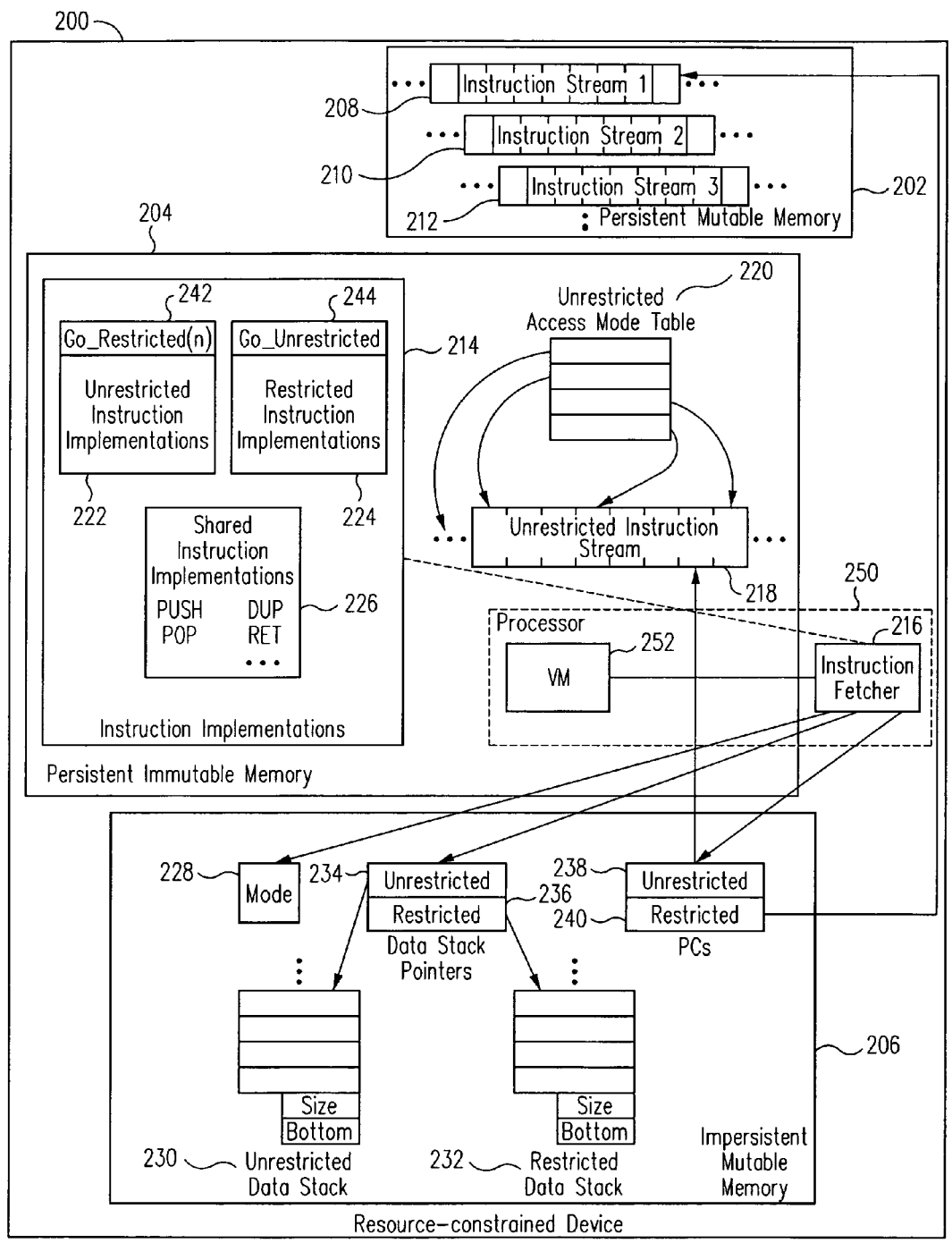
FIG. 2 is a block diagram that illustrates a resource-constrained device configured for multiple instruction execution modes, in accordance with one embodiment of the present invention.

Turning now to FIG. 2, a block diagram that illustrates a resource-constrained device configured for multiple instruction execution modes, in accordance with one embodiment of the present invention, is presented. As shown in FIG. 2, resource-constrained device 200 includes a first memory 202, a second memory 204, and a third memory 206. First memory 202 includes one or more restricted instruction streams 208, 210, 212 including one or more instructions. Second memory 204 includes one or more unrestricted instruction implementations 222, one or more restricted instruction implementations 224, and zero or more shared instruction implementations 226. Second memory 204 also includes one or more unrestricted instruction streams 218 and one or more unrestricted access mode tables 220.

According to one embodiment of the present invention, an unrestricted access mode table 220 includes an unrestricted entry points table having one or more entry points. An entry point references an instruction in the one or more unrestricted instruction streams 218. According to another embodiment of the present invention, an unrestricted access mode table 220 includes an unrestricted call points table having one or more call points. A call point references an instruction in a restricted instruction stream 208, 210, 212 that calls a program unit in an unrestricted instruction stream 218.

Processor 250 is configured to execute one or more instruction implementations 214. Processor 250 includes an instruction fetcher 216 configured to fetch one or more instruction implementations 214. The functionality of processor 250 may be implemented at least in part as a software program executing instructions stored in second memory 204, as indicated by virtual machine (VM) 252. Third memory 206 includes an instruction execution mode indicator 228, an unrestricted data stack 230, a restricted data stack 232, an unrestricted data stack pointer 234, a restricted data stack pointer 236, an unrestricted program counter 238, and a restricted program counter 240.

Many other devices or subsystems (not shown) may be connected in a similar manner. Also, it is not necessary for all of the components shown in FIG. 2 to be present to practice the various embodiments of the present invention, as discussed below. Furthermore, the components may be interconnected in different ways from that shown in FIG. 2. Code to implement the present invention may be operably disposed in system memory or stored on storage media such as fixed disk, floppy disk, flash memory or CD-ROM.

According to one embodiment of the present invention, resource-constrained device 200 includes a processor 250 configured to execute the one or more instruction implementations determined based at least in part on a value of instruction execution mode indicator 228. According to another embodiment of the present invention, processor 250 includes a virtual machine 252.

In operation, instruction execution begins in an unrestricted instruction execution mode. Instruction fetcher 216 determines whether a current program counter value is taken from the value of unrestricted program counter 238 or the value of restricted program counter 240 based at least in part on the value of instruction execution mode indicator 228. Instruction fetcher 216 also determines which instruction implementation to fetch based at least in part on the value of instruction execution mode indicator 228 and the value of the current program counter. A determination whether to use the value of unrestricted data stack pointer 234 or the value of restricted data stack pointer 236 as the current data stack pointer is also based at least in part on the value of instruction execution mode indicator 228. The one or more instruction implementations are executed using the current data stack pointer for references to the data stack corresponding to the current data stack pointer value.

Execution of the one or more instruction implementations may modify one or more of the following values: the value of current program counter value (238, 240), the value of current data stack pointer (234, 236), and the value of instruction execution mode indicator 228. By way of example, execution of a "Jump" instruction implementation may change the value of current program counter (238, 240) to the destination address of the "Jump" instruction.

As a further example, execution of a "Push" instruction implementation or a "Pop" instruction implementation may change the value of current data stack pointer (234, 236) to account for the addition of one or more items to the data stack or the removal of one or more items from the data stack. As a further example, execution of a "Go_Unrestricted" instruction implementation may change the value of instruction execution mode indicator 228 to indicate the current instruction execution mode is an unrestricted instruction execution mode. Likewise, execution of a "Go_Restricted" instruction implementation may change the value of instruction execution mode indicator 228 to indicate the instruction execution mode is a restricted instruction execution mode. Those of ordinary skill in the art recognize that execution of other instruction implementations may affect one or more of the value of current program counter (238, 240), the value of current data stack pointer (234, 236), and the value of instruction execution mode indicator 228.

According to one embodiment of the present invention, first memory 202 includes a persistent mutable memory such as an EEPROM, second memory 204 includes a persistent immutable memory such as a ROM, and third memory 206 includes an impersistent mutable memory such as a RAM.

According to one embodiment of the present invention, one or more of first memory 202, second memory 204, and third memory 206 are the same memory.

According to one embodiment of the present invention, one or more restricted instruction implementations are restricted to accessing data within an address range of a memory, where an address range of a memory includes one or more contiguous memory locations. According to another embodiment of the present invention, one or more restricted instruction implementations are restricted to accessing data within a memory zone of a memory, where a memory zone of a memory includes one or more address ranges of a memory. Those of ordinary skill in the art recognize instruction implementations may be restricted in other ways.

In the context of this specification, a shared instruction includes an instruction associated with an instruction implementation that is configured for use by either an unrestricted instruction stream or a restricted instruction stream. The privileges associated with a shared instruction are based at least in part on a current instruction execution mode.

According to one embodiment of the present invention, the one or more unrestricted instruction implementations include one or more "Go_Restricted" instruction implementations 242 configured to transition to a restricted instruction execution mode, and the one or more restricted instruction implementations include one or more "Go_Unrestricted" instruction implementations 244 configured to transition to an unrestricted instruction execution mode.

According to one embodiment of the present invention, instruction fetcher 216 is configured to share instruction fetch cycles between a restricted instruction execution mode and an unrestricted instruction execution mode. This allows an unrestricted interpreter (not shown in FIG. 2) and a restricted interpreter (not shown in FIG. 2) to have separate states, yet share the same instruction fetcher infrastructure.

According to one embodiment of the present invention, one or more restricted instruction streams 208, 210, 212 include one or more application programs, and unrestricted instruction stream 218 includes one or more kernel or operating system programs. This facilitates applying formal reasoning to assess the trustworthiness or integrity of the application programs.

According to another embodiment of the present invention, one or more restricted instruction streams 208, 210, 212 include one or more Java Card™ virtual machine instructions, and unrestricted instruction stream 218 includes one or more Java Card™ virtual machine instructions.

Figure 4:
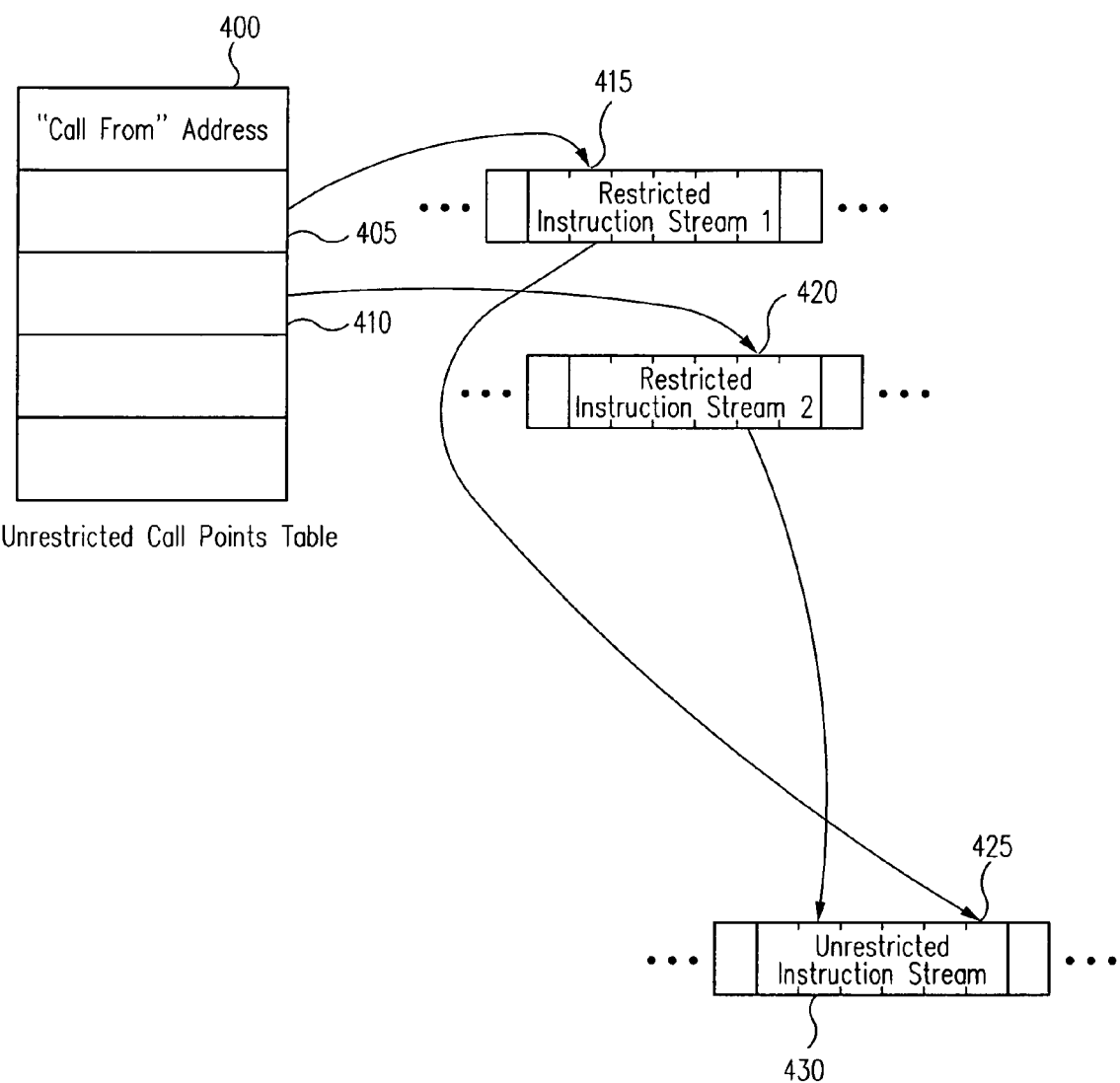
FIG. 4 is a block diagram that illustrates an unrestricted call points table, in accordance with one embodiment of the present invention.

FIGS. 3 and 4 illustrate unrestricted access mode tables, in accordance with embodiments of present invention. FIGS. 3 and 4 provide more detail for unrestricted access mode tables 220, 520, 1220, and 2710 of FIGS. 2, 5, 12, and 27, respectively. FIG. 3 illustrates an unrestricted entry points table and FIG. 4 illustrates an unrestricted call points table.

Turning now to FIG. 3, a block diagram that illustrates an unrestricted entry points table, in accordance with one embodiment of present invention, is presented. As shown in FIG. 3, an unrestricted entry points table includes one or more "Jump To" address fields 300 and zero or more "Pre-Jump" instruction fields 305 corresponding to one or more "Jump To" addresses. Each "Jump To" address in "Jump To" address fields 300 includes a reference to a location being jumped to. The reference may be an absolute address or a relative address. Zero or more "Pre-Jump" instructions, in zero or more "Pre-Jump" instruction fields 305, corresponding to a "Jump To" address in one of "Jump To" address fields 300, are executed prior to jumping to the "Jump To" address. The zero or more "Pre-Jump" instructions in "Pre-Jump" instruction fields 305 determine the suitability of a jump to the "Jump To" address in the corresponding field in "Jump To" address fields 300. By way of example, a "Pre-Jump" instruction may determine whether the "Jump To" address is being called from a suitable calling location. As a further example, one or more "Pre-Jump" instructions may implement processes 2000 or 2005 as described below with respect to FIG. 20. Those of ordinary skill in the art recognize that other "Pre-Jump" instructions are possible.

"Pre-Jump" instructions in fields 305 are unrestricted instructions by virtue of the fact that the "Pre-Jump" instructions are located within the unrestricted entry points table, which is located in a trusted memory location.

According to one embodiment of the present invention, the number of storage units allocated for each "Pre-Jump" instruction field associated with a "Jump To" address is fixed, thus facilitating computation of the address of each unrestricted entry points table entry.

According to one embodiment of the present invention, portions of "Pre-Jump" instruction fields 305 that are not used include one or more NOP instructions. As known to those skilled in the art, a NOP instruction is a command given to the processor that has no effect on the processor state.

According to embodiments of the present invention, a resource-constrained device may include multiple restricted instruction streams, with each restricted instruction stream associated with a different set of restrictions. The restrictions may be organized as a strict hierarchy. Alternatively, the restrictions may be organized as a lattice, where restrictions of restricted instruction sets may overlap, but at least one set of restrictions is not a proper subset of one another. As known to those skilled in the art, a "proper subset" is a subset with some or none of the elements of the original set, but with no new elements. A set is not a proper subset of itself.

FIG. 4 is a block diagram that illustrates an unrestricted call points table, in accordance with one embodiment of the present invention. As shown in FIG. 4, an unrestricted call points table includes one or more "call from" address fields. Each "Call From" address field 400 stores a reference to a location being jumped from. Using FIG. 4 as an example, the "Call From" address in field 405 matches location 415 in restricted instruction stream one. An instruction at "Call From" address in location 415 makes a call to location 425 in the unrestricted instruction stream. The reference may be an absolute address or a relative address. Similarly, the "Call From" address in field 410 matches location 420 in restricted instruction stream two. An instruction at "Call From" address in location 420 makes a call to location 430 in the unrestricted instruction stream. The reference may be an absolute address or a relative address.

Figure 5:
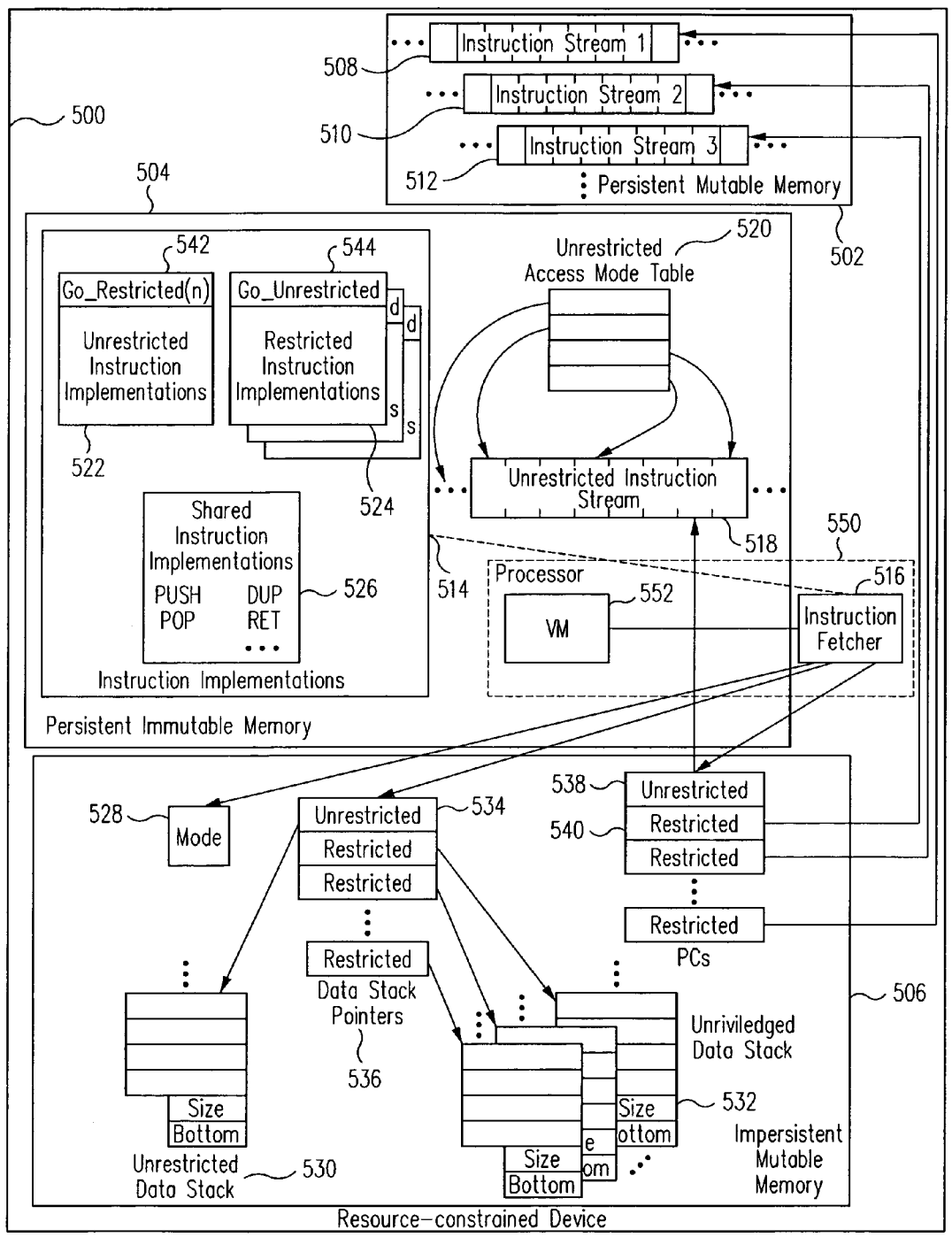
FIG. 5 is a block diagram that illustrates a resource-constrained device configured for an unrestricted instruction execution mode and multiple restricted instruction execution modes, in accordance with one embodiment of the present invention.

Turning now to FIG. 5, a block diagram that illustrates a resource-constrained device configured for an unrestricted instruction execution mode and multiple restricted instruction execution modes, in accordance with one embodiment of the present invention, is presented. FIG. 5 is similar to FIG. 2, except the resource-constrained device of FIG. 5 is configured for multiple restricted instruction execution modes. Thus, values in multiple restricted data stack pointers 536 correspond to multiple restricted data stacks 532, values in multiple restricted program counters 540, multiple restricted instruction streams 508, 510, 512 and multiple restricted instruction implementation sets 524. Elements in FIG. 5, which are not discussed with respect to FIG. 5, are equivalent to the corresponding element in FIG. 2 having the same two least significant digits in the reference numeral.

Many other devices or subsystems (not shown) may be connected in a similar manner. Also, it is not necessary for all of the components shown in FIG. 5 to be present to practice the various embodiments of the present invention, as discussed below. Furthermore, the components may be interconnected in different ways from that shown in FIG. 5. Code to implement the present invention may be operably disposed in system memory or stored on storage media such as fixed disk, floppy disk, or CD-ROM.

According to one embodiment of the present invention, instruction implementations 514 include one or more shared restricted instruction sets which are shared by multiple restricted instruction sets. By way of example, a shared restricted instruction set may include one or more "Go_Unrestricted" instruction implementations. Separate restricted instruction sets may be configured to perform specialized tasks, such as performing encryption operations, decryption operations, or both.

Figure 6:
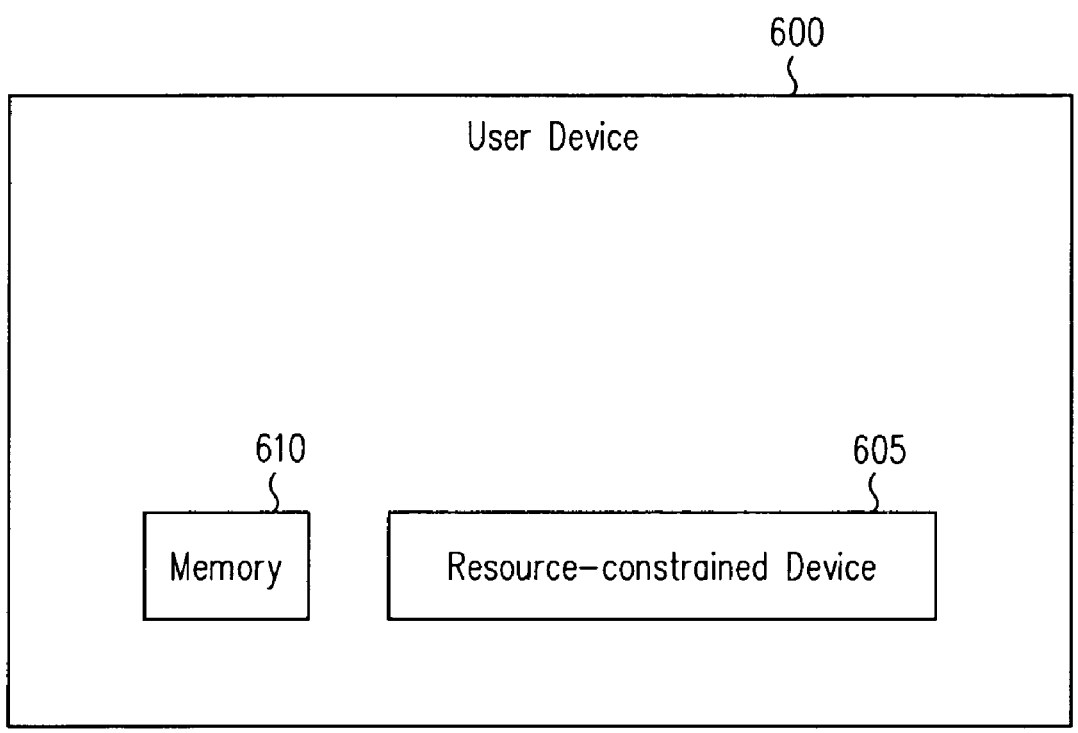
FIG. 6 is a block diagram that illustrates a user device comprising a resource-constrained device configured for multiple instruction execution modes, in accordance with one embodiment of the present invention.

Turning now to FIG. 6, a block diagram that illustrates a user device including a resource-constrained device configured for multiple instruction execution modes, in accordance with one embodiment of the present invention, is presented. As shown in FIG. 6, user device 600 includes a memory 610 and a resource-constrained device 605 configured for multiple instruction execution modes. User device 600 may be any device configured to execute a program. By way of example, user device 600 may be a personal digital assistant (PDA), a personal computer (PC), a mobile phone, a digital audio player (such as an MP3 player), a game console, a server computer in communication with a user display, or the like. Resource-constrained device 605 includes a secure portable device such as a Java Card™ technology-enabled device, or the like. As noted above, Java Card™ technology is described in Z. Chen, Java Card™ Technology for Smart Cards—Architecture and Application Programmer's Guide, Boston, Addison-Wesley, (2000), which is incorporated herein by reference to demonstrate the level of skill in the art, and the scope of and meaning associated with Java Card™ technology.

According to one embodiment of the present invention, user device 600 includes a resource constrained device 605 that in turn is a CDMA technology-enabled smart card. CDMA technology-enabled smart cards are described in *Smart Card Stage I Description*, Version 1.1, CDMA Development Group—Smart Card Team Document (May 22, 1996).

According to another embodiment of the present invention, user device 600 includes a resource constrained device 605 that in turn is a SIM (Subscriber Identity Module) card. The term "SIM card" describes the smart card used in GSM (Global System for Mobile Communications) mobile telephones. The SIM includes the subscriber's personal cryptographic identity key and other information such as the current location of the phone and an address book of frequently called numbers. The SIM is described in *Digital cellular telecommunications system (phase 2+); Specification of the Subscriber Identity Module-Mobile Equipment (SIM-ME) interface*, ETSI, GSM 11.11 version 7.4.0, Release 1998.

According to another embodiment of the present invention, user device 600 includes a resource constrained device 605 that in turn is a WIM (Wireless Interface Module) 605. A WIM is a smart card in a WAP (Wireless Application Protocol) phone. It is described in *Wireless Identity Module Part: Security*, WAP-260-WIM-20010712-a, Wireless Application Protocol Forum, Jul. 12, 2001.

According to another embodiment of the present invention, user device 600 includes a resource constrained device 605 that in turn is a USIM (Universal Subscriber Identity Module). A USIM is a smart card for a 3GPP ($3^{rd}$ Generation Partnership Project) mobile phone. It is described in *3rd Generation Partnership Project; Technical Specification Terminals; USIM and IC card requirements*, Release 4, 3GPP TS 21.111 V4.0.0 (2001-03).

According to another embodiment of the present invention, user device 600 includes a resource constrained device 605 that in turn is a UIM (User Identity Module) 605. A UIM is a smart card for a 3GPP Project 2 (3GPP2) mobile phone. The term "R-UIM" is used when the smart card is removable. A UIM is a super set of the SIM and allows CDMA (Code Division Multiple Access)-based cellular subscribers to roam across geographic and device boundaries. The R-UIM is described in a specification issued by the 3rd Generation Partnership Project 2 (3GPP2) and entitled 3rd Generation Partnership Project 2; Removable User Identity Module (R-UIM) for cdma2000 Spread Spectrum Systems, 3GPP2 C.S0023-0, Jun. 9, 2000.

The above description regarding various mobile phone technologies is not intended to be limiting in any way. Those of ordinary skill in the art recognize in view of this disclosure that other devices may be used.

According to embodiments of the present invention, the instruction execution mode determines (1) an instruction reference to an instruction implementation, (2) a current data stack pointer value, and (3) a current program counter value. This is explained in more detail below with reference to FIG. 7.

Figure 7:
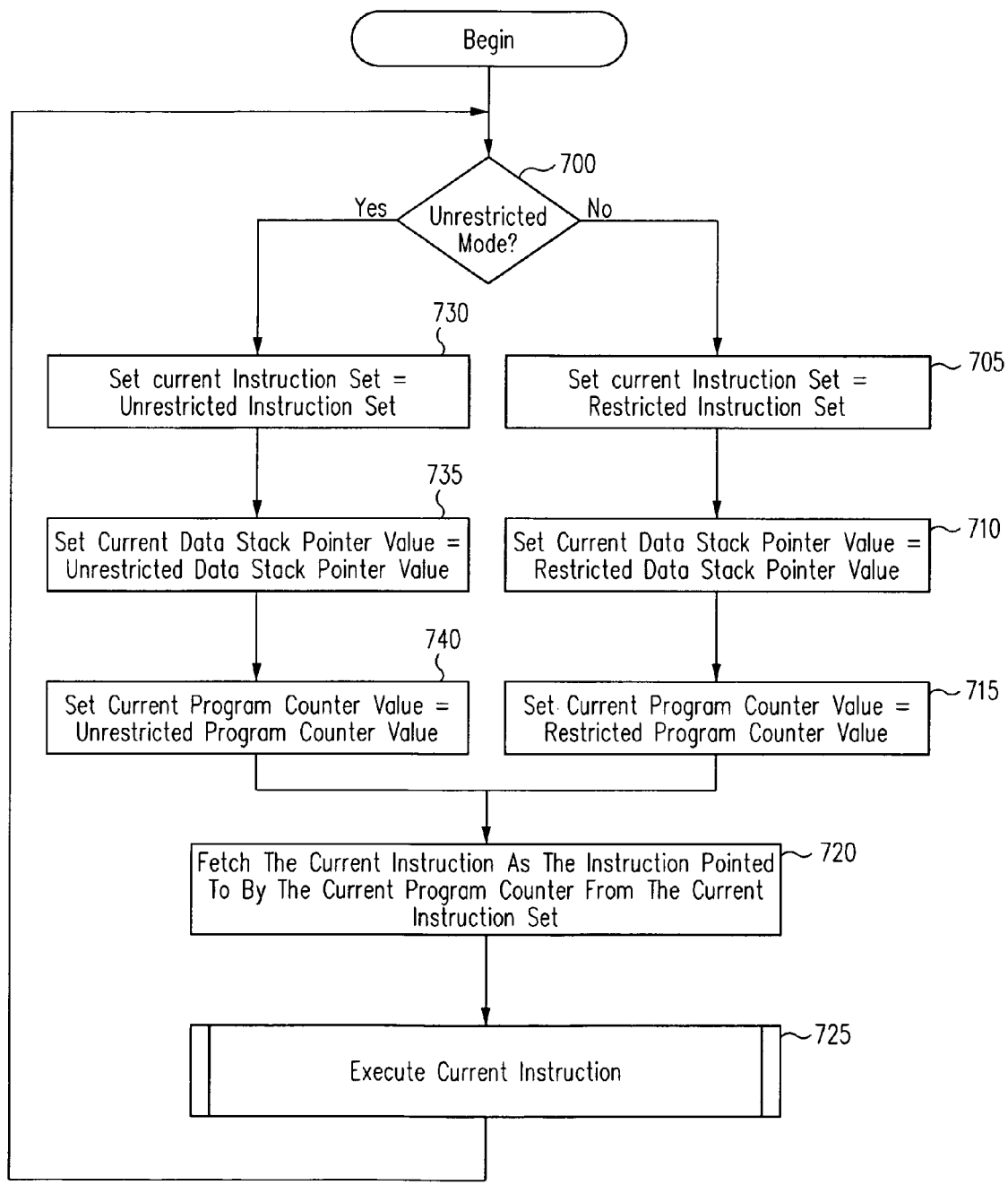
FIG. 7 is a flow diagram that illustrates a method for instruction execution, in accordance with one embodiment of the present invention.

Turning now to FIG. 7, a flow diagram that illustrates a method for instruction execution, in accordance with one embodiment of the present invention, is presented.

The processes illustrated in FIG. 7 may be implemented in hardware, software, firmware, or a combination thereof, e.g., in the device of FIG. 2. At check operation 700, a determination is made whether the current instruction execution mode is an unrestricted instruction execution mode. If the current instruction execution mode is an unrestricted instruction execution mode, the current instruction set is set to the unrestricted instruction set in set operation 730, the current data stack pointer value is set to the unrestricted data stack pointer value in set operation 735, and the current program counter value is set to the unrestricted program counter value in set operation 740.

Conversely, if the current instruction execution mode is a restricted instruction execution mode, the current instruction set is set to the restricted instruction set in set operation 705, the current data stack pointer value is set to the restricted data stack pointer value in set operation 710, and the current program counter value is set to the restricted program counter value in set operation 715. In fetch operation 720, the current instruction as pointed to by the current program counter value is fetched from the current instruction set. At execution operation 725, the current instruction is executed.

While the operations shown in FIG. 7 are illustrated in a specific order, other sequences of the operations are conceivable, for example, "Set" operations 730, 735, and 740 may be performed in any order with respect to each other. Additionally, "Set" operations 705, 710, and 715 may be performed in any order with respect to each other.

Figure 8:
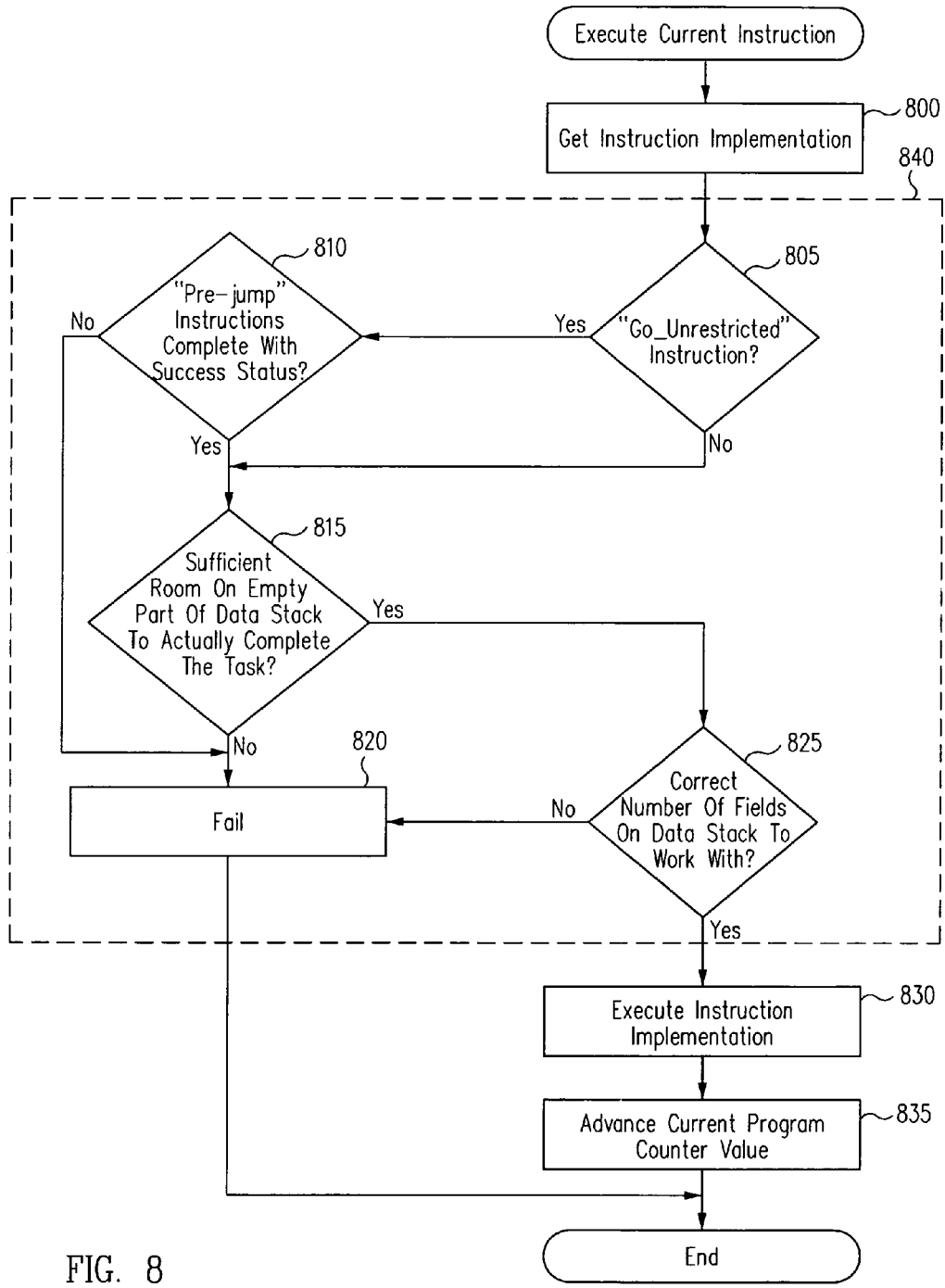
FIG. 8 is a flow diagram that illustrates a method for executing a current instruction using the unrestricted entry points table of FIG. 3, in accordance with one embodiment of the present invention.
Figure 9:
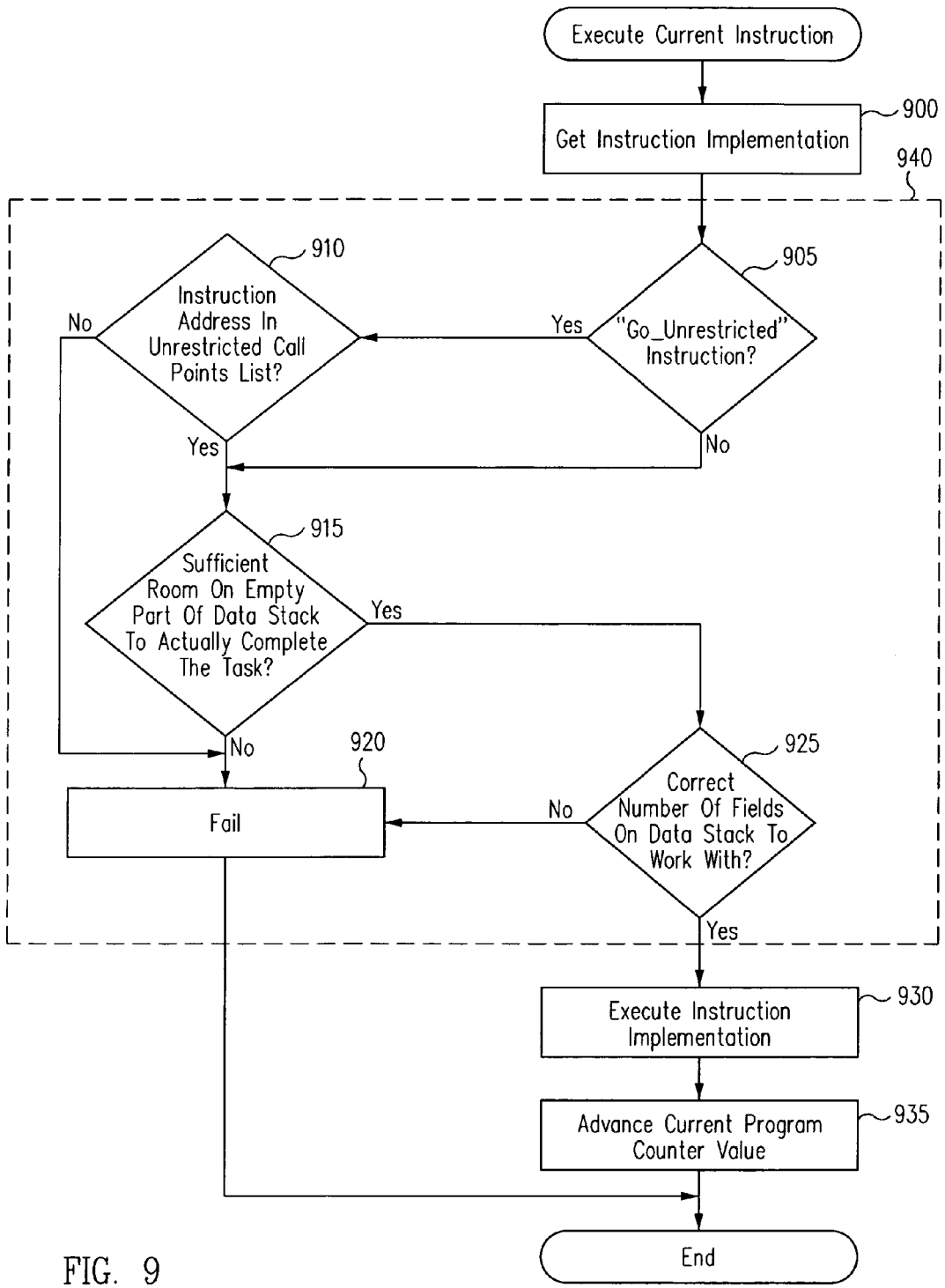
FIG. 9 is a flow diagram that illustrates a method for executing a current instruction using the unrestricted call points table of FIG. 4, in accordance with one embodiment of the present invention.

FIGS. 8 and 9 illustrate executing a current instruction, in accordance with embodiments of the present invention. FIGS. 8 and 9 provide more detail for execute operation 725 (FIG. 7). FIG. 8 illustrates executing a current instruction when the unrestricted entry points table of FIG. 3 is used as an unrestricted access mode table. FIG. 9 illustrates executing a current instruction when the unrestricted call points table of FIG. 4 is used as an unrestricted access mode table.

Turning now to FIG. 8, a flow diagram that illustrates a method for executing a current instruction using the unrestricted entry points table of FIG. 3, in accordance with one embodiment of the present invention, is presented. The processes illustrated in FIG. 8 may be implemented in hardware, software, firmware, or a combination thereof.

At get operation 800, an instruction implementation is obtained. The instruction corresponding to the instruction implementation is referenced by the value of the current program counter. The processes represented by block 840 are optional. At check operation 805, a determination is made whether the current instruction is a "Go_Unrestricted" instruction. A "Go_Unrestricted" instruction is for calling an unrestricted program unit from a restricted program unit. If the current instruction is a "Go_Unrestricted" instruction, at check operation 810 a determination is made whether the zero or more "Pre-Jump" instructions associated with the program unit being called have completed with a "success" status.

Still referring to FIG. 8, if the current instruction is not a "Go_Unrestricted" instruction, or if the current instruction is a "Go_Unrestricted" instruction and the zero or more "Pre-Jump" instructions associated with the program unit being called have completed with a "success" status, at check operation 815 a determination is made whether there is sufficient room on the empty part of the data stack to actually complete execution of the instruction implementation.

By way of example, if it is known that execution of the instruction implementation pushes four storage units on the data stack and there are only two storage units left on the empty part of the data stack, an indication that there is insufficient room on the empty part of the data stack is made. If there was sufficient room on the empty part of the data stack, at check operation 825 a determination is made whether the correct number of fields is present on the data stack.

By way of example, if it is known that execution of the instruction implementation requires four fields from the data stack and there are only two fields on the data stack prior to execution of the instruction implementation, an indication that an incorrect number of fields are present on the data stack is made. If the zero or more "Pre-Jump" instructions associated with the program unit being called have not completed with a "success" status, if there is insufficient room on the empty part of the data stack to actually complete execution of the instruction implementation, or if an incorrect number of fields are present on the data stack, a failure indication is made at fail operation 820. If the correct number of fields are present on the data stack, the instruction implementation is executed at execute operation 830 and the current program counter value is advanced at advance operation 835.

While the operations shown in FIG. 8 are illustrated in a specific order, other sequences of the operations are conceivable, for example, check operations 810, 815, and 825 may be performed in any order with respect to each other.

Turning now to FIG. 9, a flow diagram that illustrates a method for executing a current instruction using the unrestricted call points table of FIG. 4, in accordance with one embodiment of the present invention, is presented. The processes illustrated in FIG. 9 may be implemented in hardware, software, firmware, or a combination thereof. At get operation 900, an instruction implementation is obtained. The instruction corresponding to the instruction implementation is referenced by the value of the current program counter. The processes represented by block 940 are optional. At check operation 905, a determination is made whether the current instruction is a "Go_Unrestricted" instruction. A "Go_Unrestricted" instruction is for calling an unrestricted program unit from a restricted program unit. If the current instruction is a "Go_Unrestricted" instruction, at check operation 910 a determination is made whether the address of the current instruction is included in an unrestricted call points list. An unrestricted call points list includes one or more entries that reference an instruction in a restricted instruction stream that calls a program unit in an unrestricted instruction stream. The reference may include an address, and the address may be an absolute address or a relative address.

Still referring to FIG. 9, if the current instruction is not a "Go_Unrestricted" instruction, or if the current instruction is a "Go_Unrestricted" instruction and the address of the current instruction is included in the unrestricted entry point list, at check operation 915 a determination is made whether there is sufficient room on the empty part of the data stack to actually complete execution of the instruction implementation. By way of example, if it is known that execution of the instruction implementation pushes four storage units on the data stack and there are only two storage units left on the empty part of the data stack, an indication that there is insufficient room on the empty part of the data stack is made.

If there is sufficient room on the empty part of the data stack, at check operation 925 a determination is made whether the correct number of fields are present on the data stack. By way of example, if it is known that execution of the instruction implementation requires four fields from the data stack and there are only two fields on the data stack prior to execution of the instruction implementation, an indication that an incorrect number of fields are present on the data stack is indicated. If the address of a "Go_Unrestricted" instruction is not included in the unrestricted entry point list, if there is insufficient room on the empty part of the data stack to actually complete execution of the instruction implementation, or if an incorrect number of fields are present on the data stack, a failure indication is made at fail operation 920. If the correct number of fields are present on the data stack, the instruction implementation is executed at execute operation 930 and the current program counter value is advanced at advance operation 935.

While the operations shown in FIG. 9 are illustrated in a specific order, other sequences of the operations are conceivable, for example, check operations 910, 915, and 925 may be performed in any order with respect to each other.

Use of an unrestricted access table as illustrated in FIGS. 8 and 9 provides increased security against tampering with a persistent immutable memory such as a ROM or to manipulate the address bus of a processor to fetch an instruction not in ROM. The built-in redundancy of checking the address of a caller of an unrestricted program unit in ROM against a list of valid calling addresses also in ROM makes it more difficult to perform such tampering or manipulation.

Figure 10:
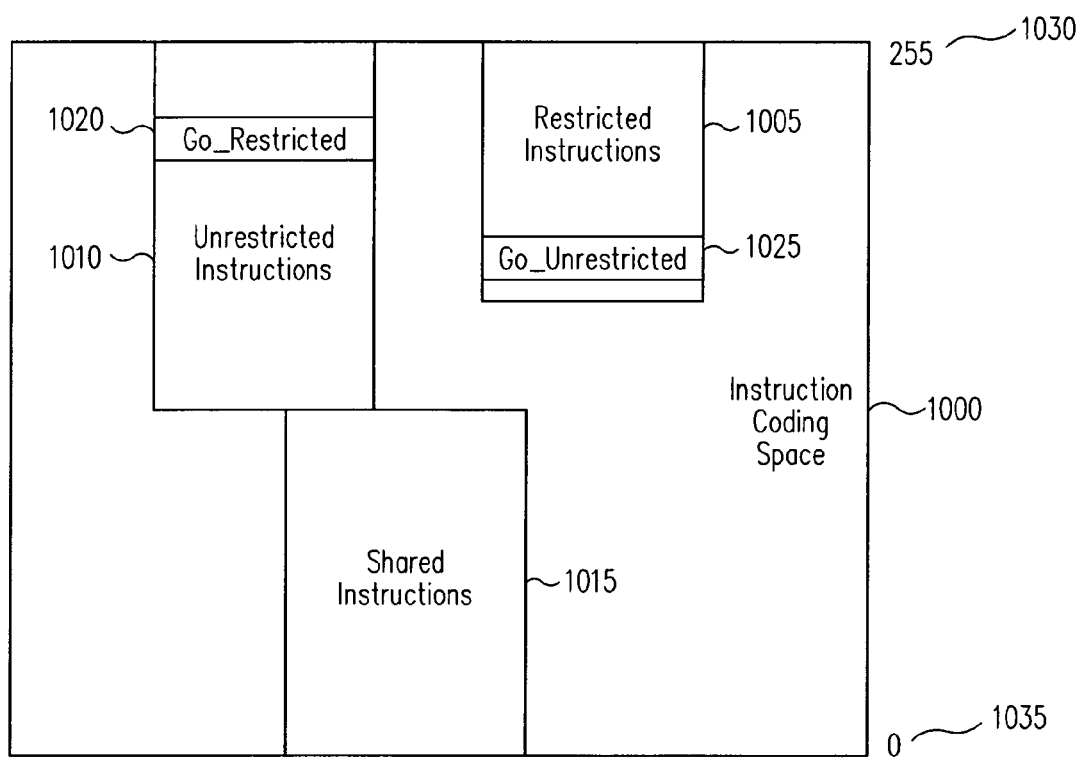
FIG. 10 is a block diagram that illustrates an instruction coding space, in accordance with one embodiment of the present invention.

Turning now to FIG. 10, a block diagram that illustrates an instruction coding space, in accordance with one embodiment of the present invention, is presented. Instruction coding space 1000 represents opcode values available for assignment to an instruction reference in an instruction set. As shown in FIG. 10, opcode values 0 (1035) through 255 (1030) are available for use as opcode values. Subset 1005 of instruction coding space 1000 is used for restricted instruction references. According to one embodiment of the present invention, the restricted instruction references reference one or more instruction implementations in a Java Card™ technology instruction set.

Subset 1010 of instruction coding space 1000 is used for unrestricted instruction references. Subset 1015 of instruction coding space 1000 is used for shared instruction references. The opcode values used for shared instruction references are the same for unrestricted instruction references and restricted instruction references. Thus, the instruction coding space for an unrestricted instruction set includes subset 1010 and subset 1015, and the instruction coding space for a restricted instruction set includes subset 1005 and subset 1015. The size of subset 1010 may differ from subset 1005. Additionally, the size of entire coding space 1000 may be more than or less than 255.

According to one embodiment of the present invention, unrestricted instruction coding space subset 1010 includes at least one value assigned to an instruction for resuming a restricted instruction execution mode (1020), and restricted instruction coding space subset 1005 includes at least one value assigned to an instruction for transitioning to an unrestricted instruction execution mode (1025).

Figure 11A:
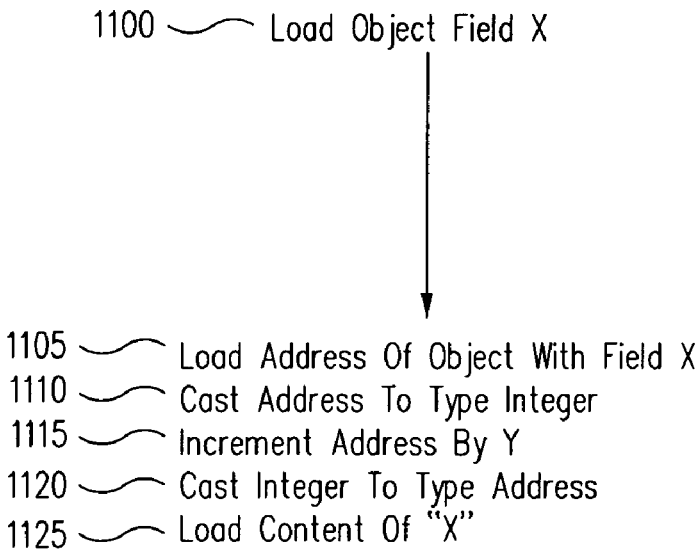
FIG. 11A is a block diagram that illustrates defeating a type system.
Figure 11B:
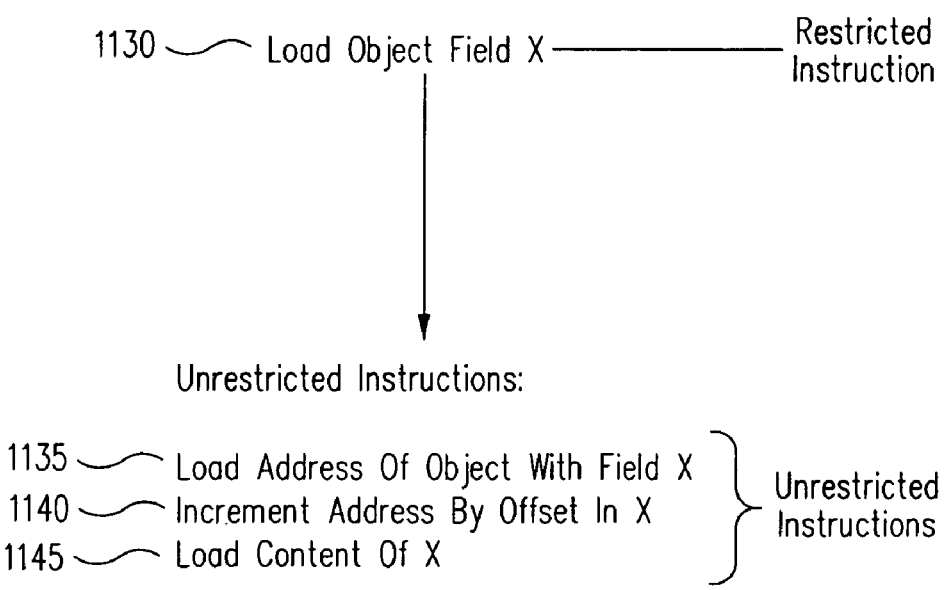
FIG. 11B is a block diagram that illustrates implementing at least one instruction in a first instruction execution mode, in an instruction stream of a second instruction execution mode, in accordance with one embodiment of the present invention.

FIGS. 11A-11B illustrate defeating a type system, and how this can be avoided by embodiments of the present invention. FIG. 11A illustrates defeating a type system, and FIG. 11B illustrates implementing at least one instruction in a first instruction execution mode, in an instruction stream of a second instruction execution mode.

Turning now to FIG. 11A, a block diagram that illustrates defeating a type system is presented. As shown in FIG. 11A, a high-level "Load" instruction 1100 is implemented via several lower-level instructions 1105, 1110, 1115, 1120, 1125. High-level "Load" instruction 1100 is for loading a particular field of an object. High level "Load" instruction 1100 is implemented by loading an address value of the object (1105), casting a type of object to type integer (1110), incrementing the address value by an integer value "Y" using integer arithmetic (1115), casting the type of the object back to type address, and then loading the value stored at that address (1125). The value "Y" is ostensibly the offset within the object where field X is stored. Unfortunately, the value "Y" is subject to manipulation. Thus, the value "Y" could be set to a value other than the offset within the object where field X is stored, allowing unfettered access to other memory locations.

FIG. 11B is a block diagram that illustrates implementing at least one instruction in a first instruction execution mode, in an instruction stream of a second instruction execution mode, in accordance with one embodiment of the present invention. In more detail, FIG. 11B illustrates implementing a restricted instruction using an unrestricted instruction stream. As shown in FIG. 11B, a restricted high-level "Load" instruction 1130 is implemented by one or more unrestricted low-level instructions 1135, 1140,1145 in an unrestricted instruction stream. The unrestricted instructions load the address of the object (1135), increment the address by the offset within the object where the value X is stored (1140), and load the value stored at that address (1145). Because the operations that effect the manipulation of the address of the object are implemented in unrestricted instructions, unfettered access by restricted instructions to other memory locations is avoided.

FIGS. 12-21 illustrate instruction execution on a resource-constrained device configured for multiple instruction execution modes using a merged data stack, in accordance with embodiments of the present invention. A single data stack 1232 (FIG. 12) is used for both restricted instruction execution modes and unrestricted instruction execution modes. A value of a shared current data stack bottom pointer 1234 is used to indicate the bottom of the single data stack in both an unrestricted instruction execution mode and a restricted instruction execution mode, thus obviating the need to maintain multiple data stacks. The value of shared current data stack bottom pointer 1234 relates to the value of instruction execution mode indicator 1228 and equals the value of data stack pointer 1236, the value of hard data stack bottom pointer 1246, or a value between the value of data stack pointer 1236 and the value of hard data stack bottom pointer 1246.

Figure 12:
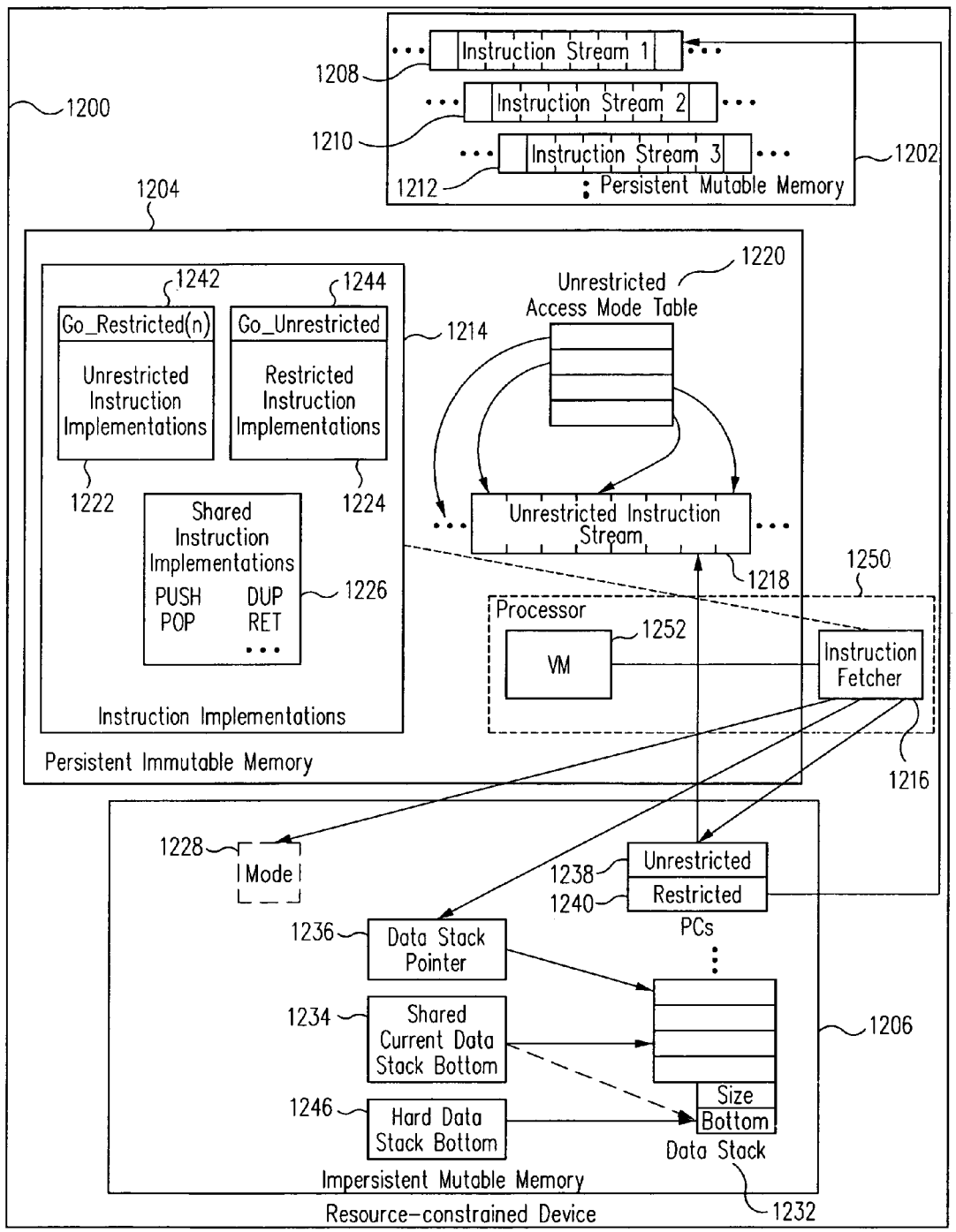
FIG. 12 is a block diagram that illustrates a resource-constrained device configured for multiple instruction execution modes using a merged data stack, in accordance with one embodiment of the present invention.

FIG. 12 is a block diagram of a resource-constrained device configured for multiple instruction execution modes using a merged data stack, in accordance with one embodiment of the present invention. As shown in FIG. 12, resource-constrained device 1200 includes a first memory 1202, a second memory 1204, and a third memory 1206. First memory 1202 includes one or more restricted instruction streams (1208, 1210, 1212) that each, in turn, includes one or more instructions. Second memory 1204 includes one or more unrestricted instruction implementations 1222, one or more restricted instruction implementations 1224, and zero or more shared instruction implementations 1226. Second memory 1204 also includes one or more unrestricted instruction streams 1218 and one or more unrestricted access mode tables 1220.

According to one embodiment of the present invention, an unrestricted access mode table 1220 includes an unrestricted entry points table having one or more entry points. An entry point references an instruction in the one or more unrestricted instruction streams 1218.

According to another embodiment of the present invention, an unrestricted access mode table 1220 includes an unrestricted call points table having one or more call points. A call point references an instruction in a restricted instruction stream (1208, 1210, 1212) that calls a program unit in an unrestricted instruction stream 1218.

Processor 1250 is configured to execute one or more instruction implementations 1214. Processor 1250 includes an instruction fetcher 1216 configured to fetch one or more instruction implementations. The functionality of processor 1250 may be implemented at least in part as a software program executing instructions stored in second memory 1204, as indicated by virtual machine (VM) 1252.

Third memory 1206 includes an instruction execution mode indicator 1228, a data stack 1232, a shared current data stack bottom pointer 1234, a data stack pointer 1236, an unrestricted program counter 1238, and a restricted program counter 1240. The values stored in both shared current data stack bottom pointer 1234 and data stack pointer 1236 point to the same data stack 1232.

Many other devices or subsystems (not shown) may be connected in a similar manner. Also, it is not necessary for all of the components shown in FIG. 12 to be present to practice the various embodiments of the present invention, as discussed below. Furthermore, the components may be interconnected in different ways from that shown in FIG. 12. Code to implement the present invention may be operably disposed in system memory or stored on storage media such as fixed disk, floppy disk, or CD-ROM.

Eliminating one of two data stacks results in a more efficient use of RAM. By way of example, assume the maximum unrestricted data stack usage is 2 Kbytes and occurs at time T1, and the maximum restricted data stack usage is 3 Kbytes and occurs at time T2. Assume further that the maximum combined data stack usage is 4 Kbytes and occurs at time T3. In this case, maintaining two separate data stacks would require 3 Kbytes for the restricted data stack and 2 Kbytes for the unrestricted data stack, for a combined total of 5 Kbytes. This is because each data stack must allocate enough memory to accommodate the worst case scenario. However, maintaining a single merged data stack 1232 required only 4 Kbytes for the single merged data stack because the maximum restricted data stack usage and the maximum unrestricted data stack usage occur at different times.

Additionally, an unrestricted instruction can easily access data in the restricted portion of the instruction data stack, thus obviating the need for a restricted instruction stream to access restricted data stack data on an unrestricted data stack prior to making a call to a program unit in an unrestricted instruction stream. Moreover, having only one data stack top and two data stack bottoms simplifies data stack operations because there are fewer pointers to maintain.

In operation, instruction execution begins in an unrestricted instruction execution mode. Instruction fetcher 1216 determines whether a value of the current program counter is taken from the value of unrestricted program counter 1238 or the value of restricted program counter 1240 based at least in part on a value of execution mode indicator 1228.

According to one embodiment of the present invention, a value of instruction execution mode indicator 1228 indicates the current instruction execution mode. According to another embodiment of the present invention, the current instruction execution mode is determined based upon whether the value of shared current data stack bottom pointer 1234 matches the value of hard data stack bottom pointer 1246. Instruction fetcher 1216 determines which instruction implementation to fetch based at least in part on the value of instruction execution mode indicator 1228 and the value of the current program counter. The one or more instruction implementations are executed using the value of current data stack pointer 1236 for references to the portion of the data stack 1232 corresponding to the current data stack pointer value.

Execution of the one or more instruction implementations may modify one or more of the current program counter values (program counters 1238, 1240), the current data stack pointer value, and the instruction execution mode value. By way of example, execution of a "Jump" instruction implementation may change the current program counter value (1238, 1240) to the destination address of the "Jump" instruction. As a further example, execution of a "Push" instruction implementation or a "Pop" instruction implementation may change the current value of data stack pointer 1236 to account for the addition of one or more items to the data stack or the removal of one or more items from the data stack.

As a further example, a "Go_Unrestricted" instruction may set the value of shared current data stack bottom pointer 1234 to value of hard data stack bottom pointer 1246. Additionally, a value of instruction execution mode indicator 1228 may be changed to indicate the current instruction execution mode is an unrestricted instruction execution mode. Likewise, a "Go_Restricted" instruction may set the value of shared current data stack bottom pointer 1234 to value of data stack pointer 1236, the value of hard data stack bottom pointer 1246, or a value between the values of data stack pointer 1236 and hard data stack bottom pointer 1246. Additionally, the value of instruction execution mode indicator 1228 may be changed to indicate the instruction execution mode is a restricted instruction execution mode. Those of ordinary skill in the art recognize that other instruction implementations may affect the current program counter value (1238, 1240), the current value of data stack pointer 1236, or the value of instruction execution mode indicator 1228.

The value of shared current data stack bottom pointer 1234 relates to the value of instruction execution mode indicator 1228 and equals the value of data stack pointer 1236, the value of hard data stack bottom pointer 1246, or a value between the data stack pointer 1236 and the hard data stack bottom pointer 1246.

According to one embodiment of the present invention, first memory 1202 includes a persistent mutable memory such as an EEPROM, second memory 1204 includes a persistent immutable memory such as a ROM, and third memory 1206 includes an impersistent mutable memory such as a RAM.

According to one embodiment of the present invention, one or more of the first memory 1202, second memory 1204, and third memory 1206 are the same memory.

According to one embodiment of the present invention, the one or more unrestricted instruction implementations include one or more "Go_Restricted" instruction implementations 1242 configured to transition to a restricted instruction execution mode, and the one or more restricted instruction implementations include one or more "Go_Unrestricted" instruction implementations 1244 configured to transition to an unrestricted instruction execution mode.

According to one embodiment of the present invention, instruction fetcher 1216 is configured to share instruction fetch cycles between a restricted instruction execution mode and an unrestricted instruction execution mode. This allows an unrestricted interpreter (not shown in FIG. 12) and a restricted interpreter (not shown in FIG. 12) to have separate states, yet share the same instruction fetcher infrastructure.

According to one embodiment of the present invention, one or more restricted instruction streams (1208, 1210, 1212) include one or more application programs, and unrestricted instruction stream 1218 includes one or more kernel or operating system programs. This facilitates applying formal reasoning to assess the trustworthiness or integrity of the application programs.

According to another embodiment of the present invention, the one or more restricted instruction streams (1208, 1210, 1212) include one or more Java Card™ virtual machine instructions, and the unrestricted instruction stream includes one or more Java Card™ virtual machine instructions.

Figure 13:
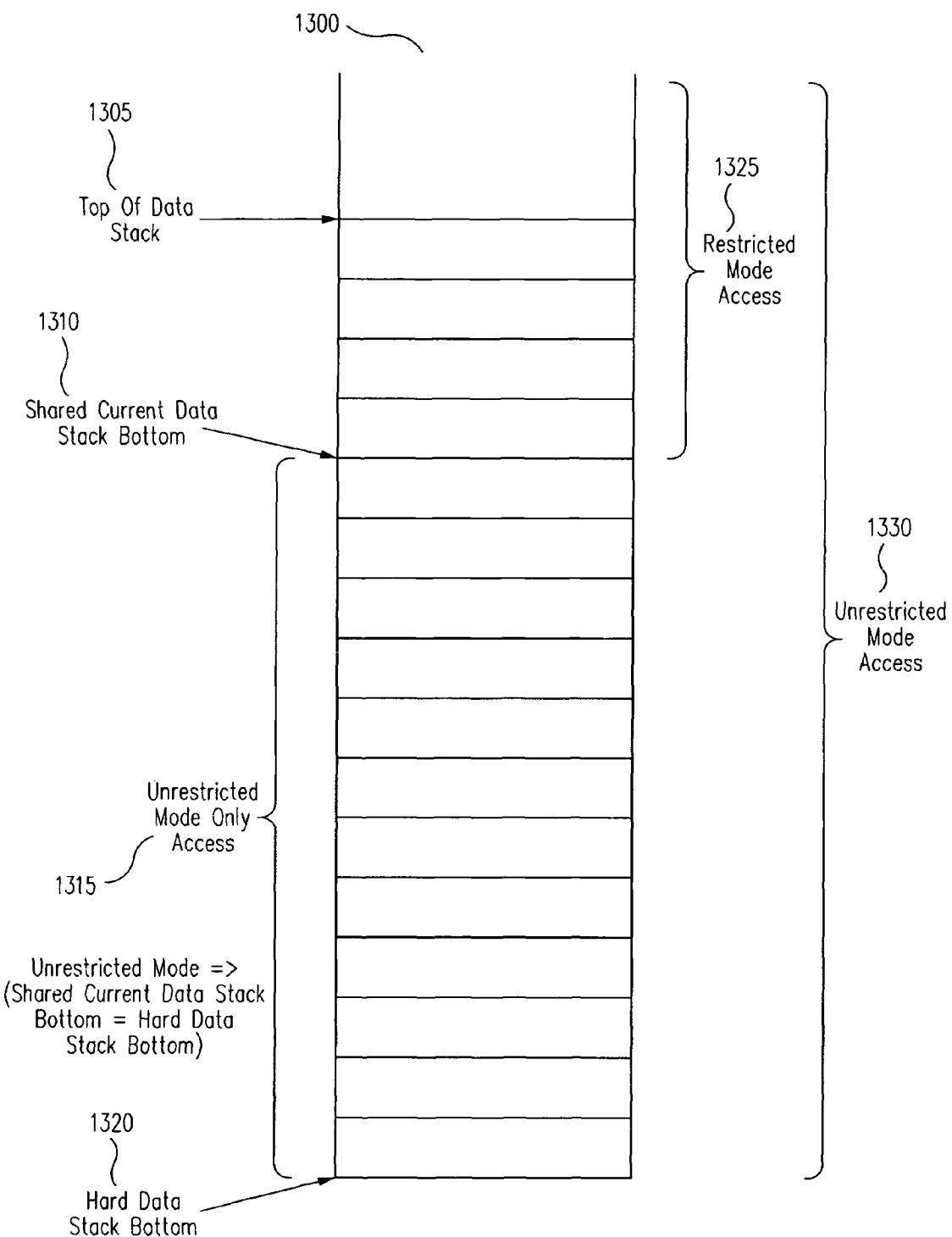
FIG. 13 is a block diagram that illustrates a merged data stack, in accordance with one embodiment of the present invention.

Turning now to FIG. 13, a block diagram that illustrates a merged data stack, in accordance with one embodiment of the present invention, is presented. FIG. 13 provides more detail for data stack 1232, data stack pointer 1236, shared current data stack bottom pointer 1234, and hard data stack bottom pointer 1246 of FIG. 12.

Data stack 1300 includes a first portion 1315 for unrestricted only mode access and a second portion 1325 for restricted mode access. Unrestricted mode access portion 1330 includes both unrestricted mode only access portion 1315 and restricted mode access portion 1325. Thus, a program unit executing in a restricted mode may access portion 1325 but not portion 1315, and a program unit executing in an unrestricted mode may access both portion 1325 and portion 1315. First portion 1315 is delineated by a value of a hard data stack bottom pointer 1320 and a value of a shared current data stack bottom pointer 1310. The second portion 1325 is delineated by the value of shared current data stack bottom pointer 1310 and a value of a top-of-stack indicator 1305.

A determination whether the current instruction execution mode is unrestricted or restricted may be made by comparing the value of shared current data stack bottom pointer 1310 with the value hard or physical data stack bottom pointer 1320. If the value of shared current data stack bottom pointer 1310 matches the value of hard data stack bottom pointer 1320, the current instruction execution mode is an unrestricted instruction execution mode.

Figure 14:
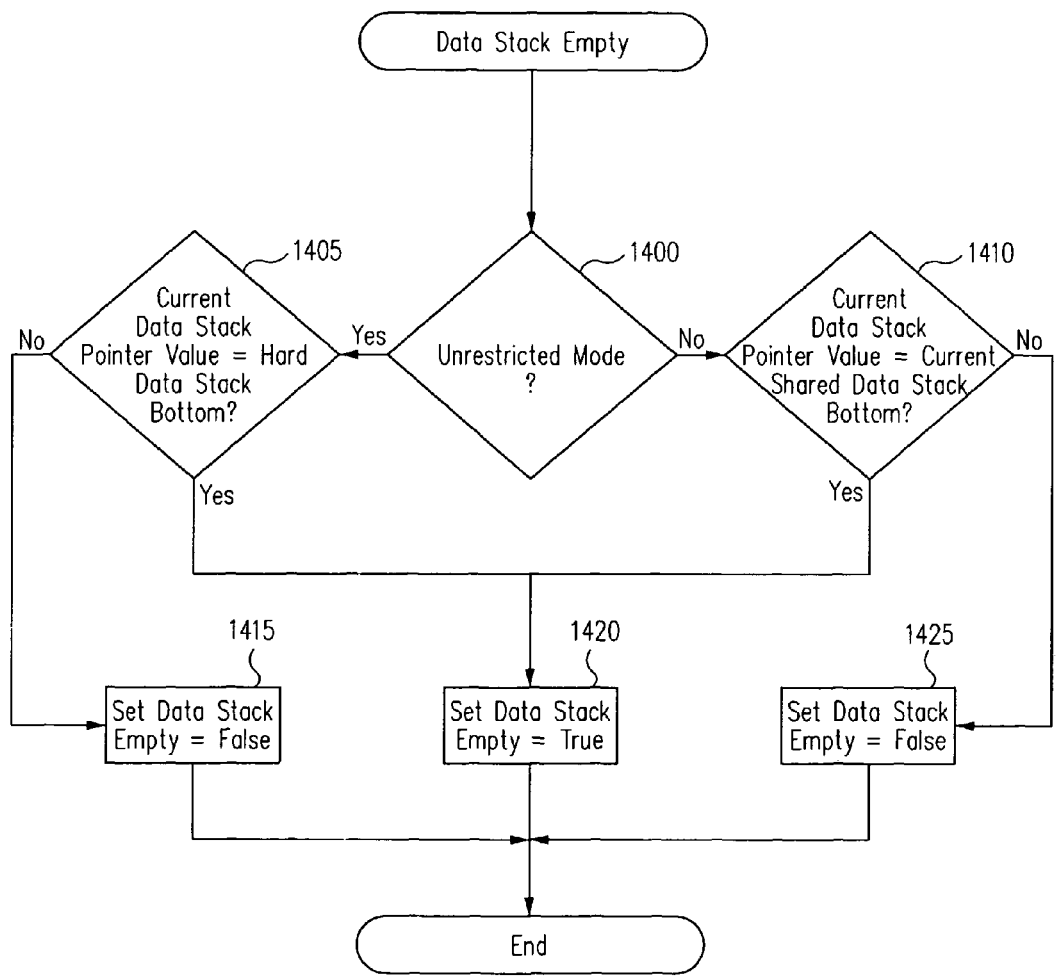
FIG. 14 is a flow diagram that illustrates a method for determining whether a merged data stack is empty, in accordance with one embodiment of the present invention.
Figure 15:
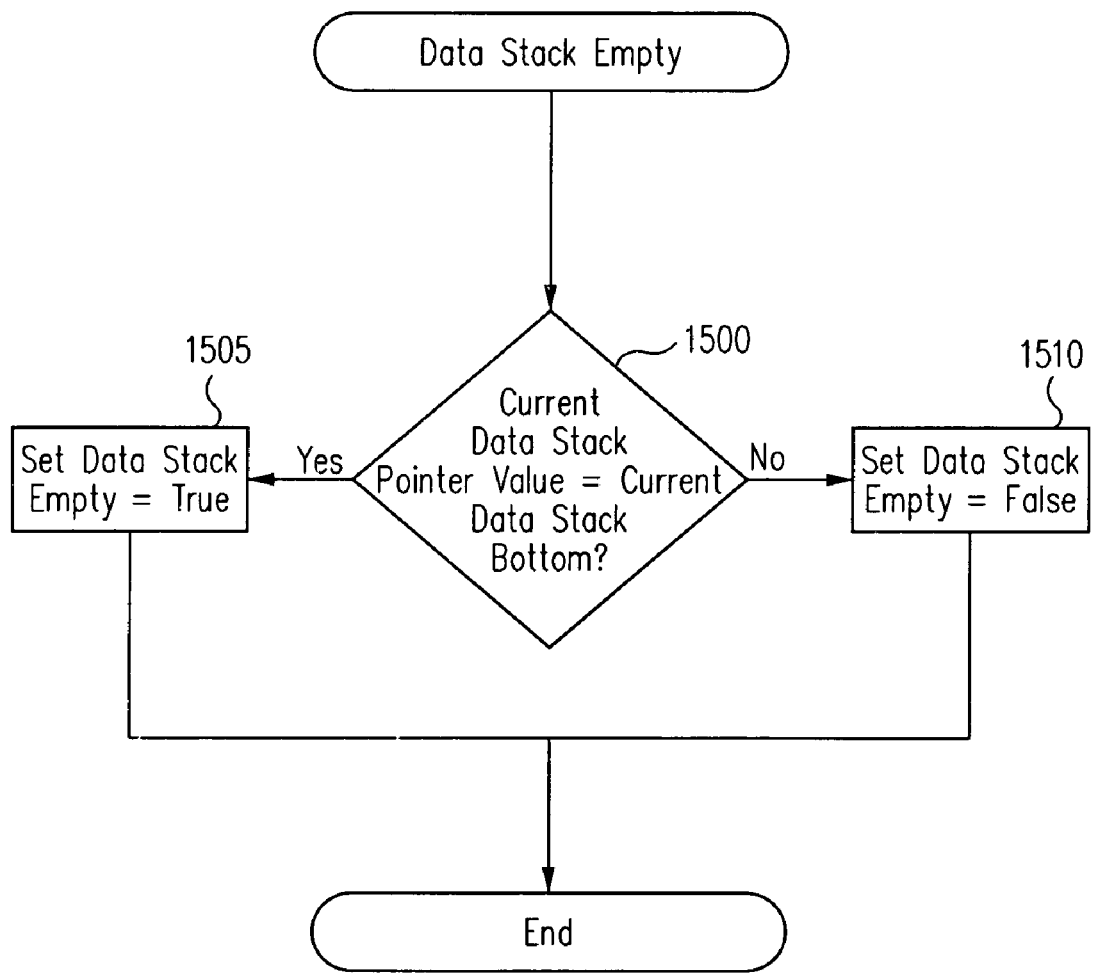
FIG. 15 is a flow diagram that illustrates a method for determining whether a merged data stack is empty based on whether a current data stack pointer value matches a current data stack bottom value, in accordance with one embodiment of the present invention.

FIGS. 14 and 15 are flow diagrams that illustrate determining whether a merged data stack is empty, in accordance with embodiments of the present invention. FIG. 14 illustrates making the determination by making one of two checks based upon a current instruction execution mode value. FIG. 15 illustrates making the determination based on whether a current data stack pointer value matches a shared current data stack bottom value.

Turning now to FIG. 14, a flow diagram that illustrates a method for determining whether a merged data stack 1232, 1300 is empty, in accordance with one embodiment of the present invention, is presented. The processes illustrated in FIG. 14 may be implemented in hardware, software, firmware, or a combination thereof.

In check operation 1400, a determination is made whether the current instruction execution mode is an unrestricted instruction execution mode. This determination may be made by examining a current instruction execution mode value. If the current instruction execution mode value indicates the current instruction execution mode is an unrestricted instruction execution mode, at check operation 1405 a determination is made whether the current data stack pointer value matches the current shared data stack bottom pointer value. If the current execution mode is a restricted instruction execution mode, at 1410 a determination is made whether the current data stack pointer value matches the shared current data stack bottom pointer value. If the result of check operation 1405 is "No", an indication that the data stack is not empty is made at set operation 1415. Likewise, if the result of check operation 1410 is "No", an indication that the data stack is not empty is made at set operation 1425. If the result of check operation 1405 or check operation 1410 is "Yes", an indication that the data stack is empty is made at set operation 1420.

Turning now to FIG. 15, a flow diagram that illustrates a method for determining whether a merged data stack is empty based on whether a current data stack pointer value matches a current data stack bottom pointer value, in accordance with one embodiment of the present invention, is presented. FIG. 15 illustrates determining whether a merged data stack is empty without reference to an instruction execution mode indicator.

At check operation 1500, a determination is made whether the current data stack pointer value matches the shared current data stack bottom pointer value. If the current data stack pointer value matches the shared current data stack bottom pointer value, an indication that the data stack is empty is made at set operation 1505. If the current data stack pointer value does not match the shared current data stack bottom pointer value, an indication that the data stack is not empty is made at set operation 1510.

Figure 16:
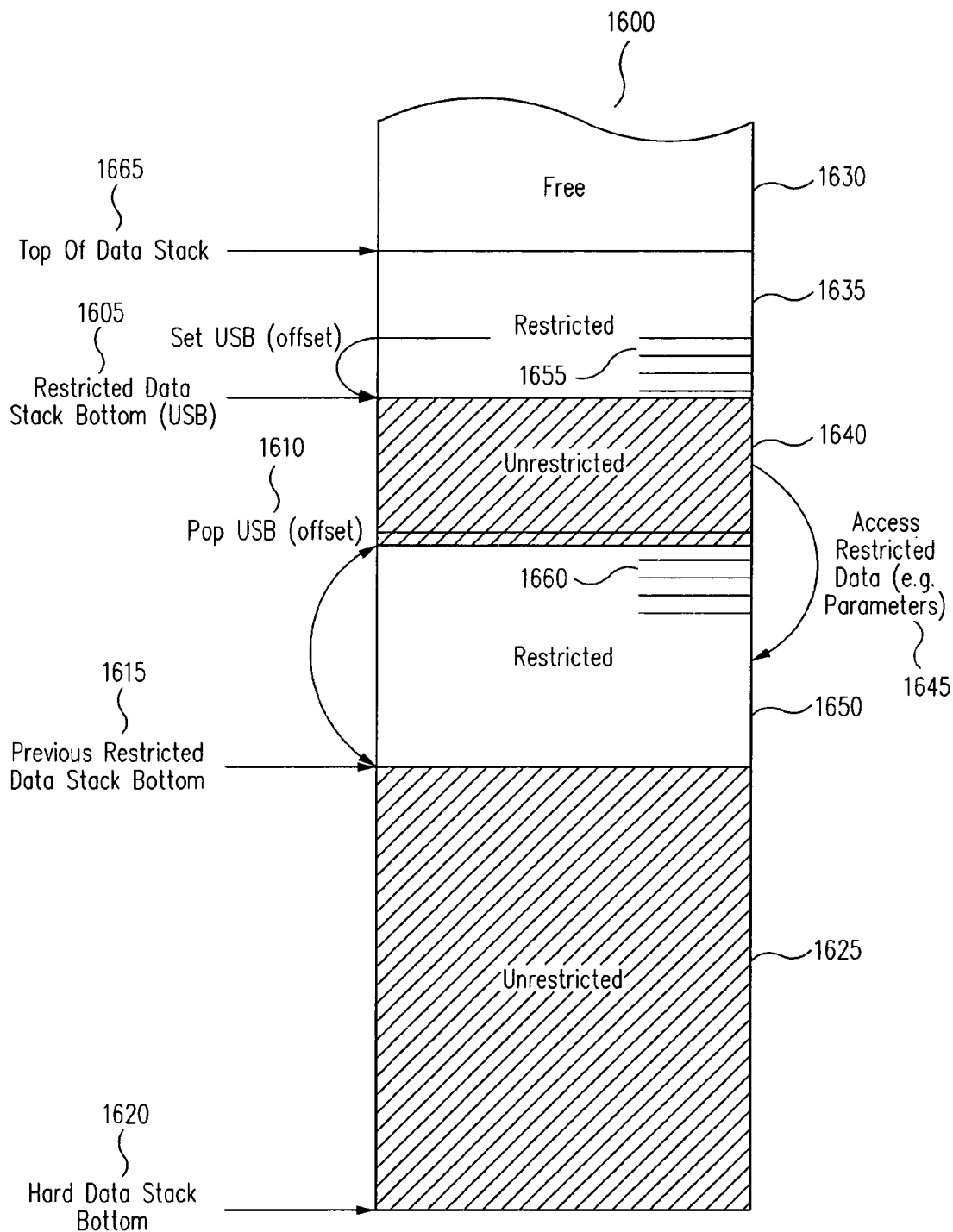
FIG. 16 is a block diagram that illustrates an interleaved data stack, in accordance with one embodiment of the present invention.

Turning now to FIG. 16, a block diagram that illustrates an interleaved data stack, in accordance with one embodiment of the present invention, is presented. As shown in FIG. 16, interleaved data stack 1600 includes a first unrestricted portion 1625 and a second unrestricted portion 1640. Interleaved data stack 1600 also includes a first restricted portion 1650 and a second restricted portion 1635. A free portion 1630 indicates a portion of data stack 1600 that is available for use for expansion of second restricted portion 1635, or for additional unrestricted portions or restricted portions that may be required during subsequent instruction execution.

First unrestricted portion 1625 is delineated by a value of a hard data stack bottom pointer 1620 and a value of a first restricted data stack bottom pointer 1615 associated with first restricted portion 1650. First restricted portion 1650 is delineated by the value of first restricted data stack bottom pointer 1615 and a value of first top-of-stack indicator 1610. Second unrestricted portion 1640 is delineated by the value of first top-of-stack pointer 1610 and a value of a second restricted data stack bottom pointer 1605 associated with second restricted portion 1635. Second restricted portion 1635 is delineated by the value of second restricted data stack bottom pointer 1605 and a value of second top-of-stack pointer 1665.

FIG. 16 illustrates the state of a data stack 1600 after chain of unrestricted and restricted program unit calls. More specifically, FIG. 16 indicates the state of data stack 1600 after a first unrestricted program unit calls a first restricted program unit, which in turn calls a second unrestricted program unit, which in turn calls a second restricted program unit.

Program execution begins with execution of the first unrestricted program unit that uses first unrestricted portion 1625 of data stack 1600. When the first unrestricted program unit calls the first restricted program unit, parameters 1660 needed for execution of the first restricted program unit are placed in first restricted portion 1650, as a restricted program unit cannot access data in an unrestricted portion. When the first restricted program unit calls the second unrestricted program unit, the value of first top-of-stack pointer 1610 is used to indicate the bottom of second unrestricted portion 1640. An unrestricted program unit may access parameters needed for execution of the unrestricted program unit, regardless of whether the parameters are stored in a restricted portion or an unrestricted portion of data stack 1600. Thus, copying parameters from first restricted portion 1650 to second unrestricted portion 1640 is not required. When the second unrestricted program unit calls the second restricted program unit, parameters 1655 needed for execution of the second restricted program unit are placed in second restricted portion 1635.

Figure 17:
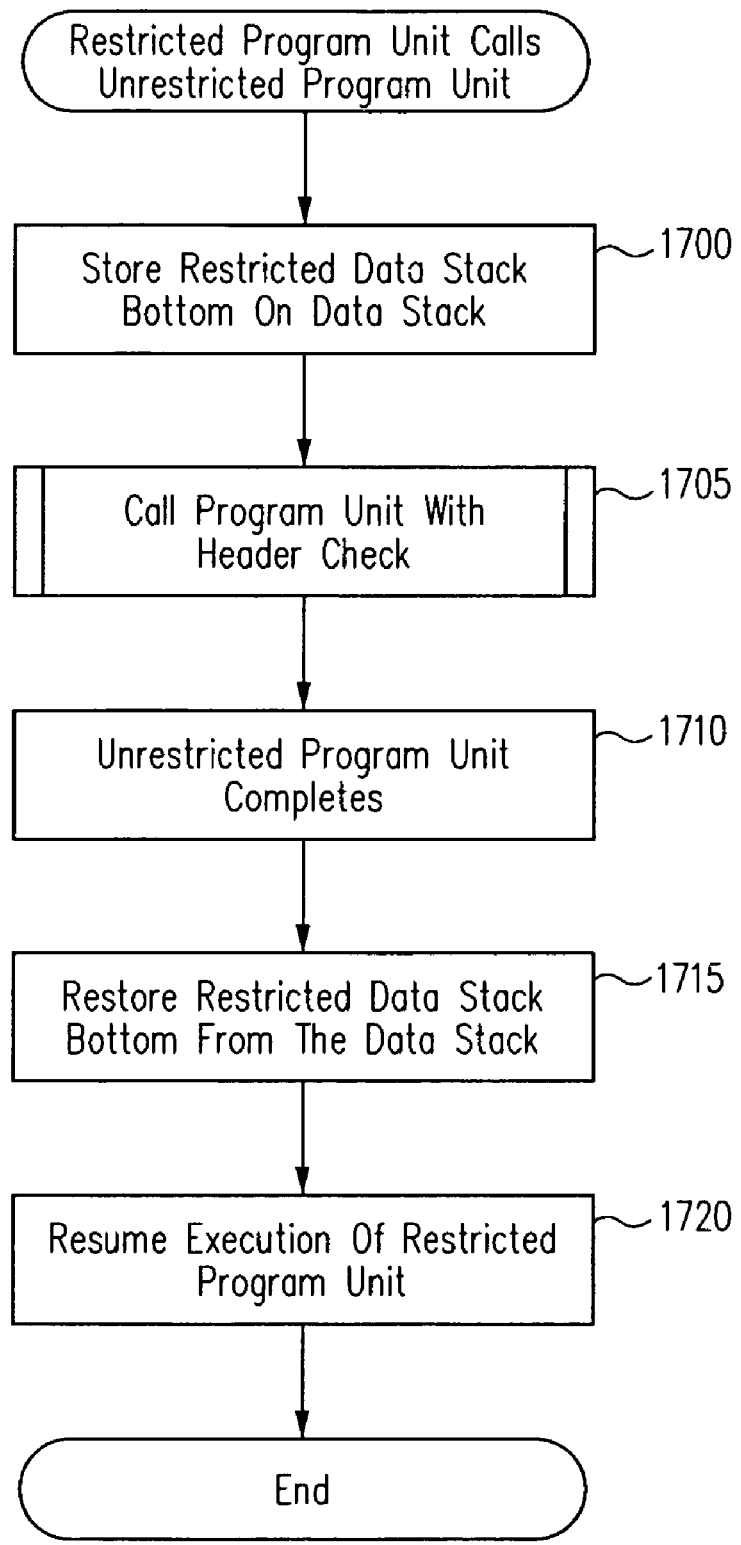
FIG. 17 is a flow diagram that illustrates a method for a restricted program unit calling an unrestricted program unit, in accordance with one embodiment of the present invention.

Turning now to FIG. 17, a flow diagram that illustrates a method for a restricted program unit calling an unrestricted program unit, in accordance with one embodiment of the present invention, is presented. The processes illustrated in FIG. 17 may be implemented in hardware, software, firmware, or a combination thereof.

At store operation 1700, an indication of the value of the restricted data stack bottom pointer is stored on the data stack. At call operation 1705, the unrestricted program unit is called. At operation 1710, the unrestricted program unit completes. At operation 1715, the value of the restricted data stack bottom pointer is restored from the data stack. At operation 1720, execution is transitioned to the restricted program unit. The restricted program unit may be transitioned to by executing a "return" instruction or a "goto finish" instruction.

Figure 18:
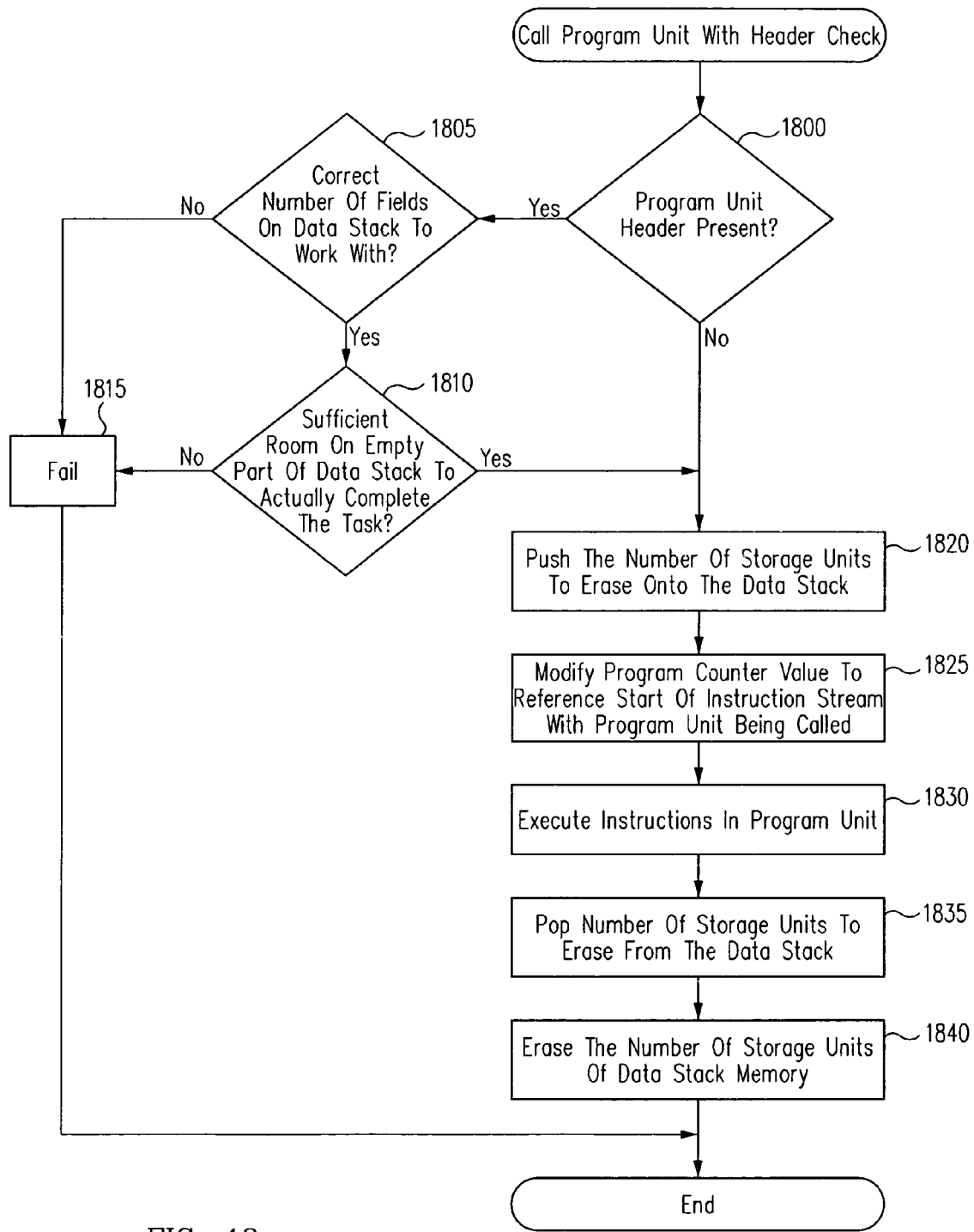
FIG. 18 is a flow diagram that illustrates a method for calling a program unit with a header check, in accordance with one embodiment of the present invention.

Turning now to FIG. 18, a flow diagram that illustrates a method for calling a program unit with a header check, in accordance with one embodiment of the present invention, is presented. FIG. 18 provides more detail for operation 1705 of FIG. 17. The processes illustrated in FIG. 18 may be implemented in hardware, software, firmware, or a combination thereof.

At check operation 1800, a determination is made whether the called unrestricted program unit is associated with a program unit header. This determination may be based at least in part on the current instruction execution mode. According to one embodiment of the present invention, if the current instruction execution mode is an unrestricted instruction execution mode and the called program unit is not associated with a program unit header, an error condition is indicated. If the called unrestricted program unit is associated with a program unit header, at check operation 1805 a determination is made whether the number of fields on the data stack is the number required for execution of the called unrestricted program unit, as indicated in the program unit header. If the number of fields is correct, at check operation 1810 a determination is made whether there is sufficient room on the empty part of the data stack to complete execution of the called unrestricted program unit.

If the result of either determination of check operations 1805 or 1810 is "No", a failure is indicated at fail operation 1815. According to one embodiment of the present invention, one or more unrestricted instructions are configured to handle such a failure condition. If no program unit header is associated with the called unrestricted program unit or if the result of both determinations of check operations 1805 and 1810 are "Yes", at push operation 1820 the number of storage units to erase from the data stack after executing instructions in the program unit is pushed onto the data stack.

According to one embodiment of the present invention, the program unit header includes an erase bit that indicates whether data stack memory used during execution of the program unit should be erased after executing instructions the program unit. If the program unit does not have a program unit header, or if the erase bit of a program header indicates data stack memory used during execution of the program unit should not be erased, the value 0 is pushed on the data stack at push operation 1820.

At modify operation 1825, the program counter value is modified to reference the start of the instruction stream with the program unit being called. At execute operation 1830, the instructions in the unrestricted program unit are executed.

At pop operation 1835, the value pushed on the data stack at push operation 1820 is popped off the data stack. At erase operation 1840, the number of storage units of data stack memory indicated by the value is erased from data stack memory. The data stack memory may be erased by writing a predetermined bit pattern to the data stack memory locations used during execution of the program unit. The bit pattern may represent the value zero, or any other predetermined value.

While the operations shown in FIG. 18 are illustrated in a specific order, other sequences of the operations are conceivable, for example, check operations 1805 and 1810 may be performed in any order with respect to each other.

Figure 19:
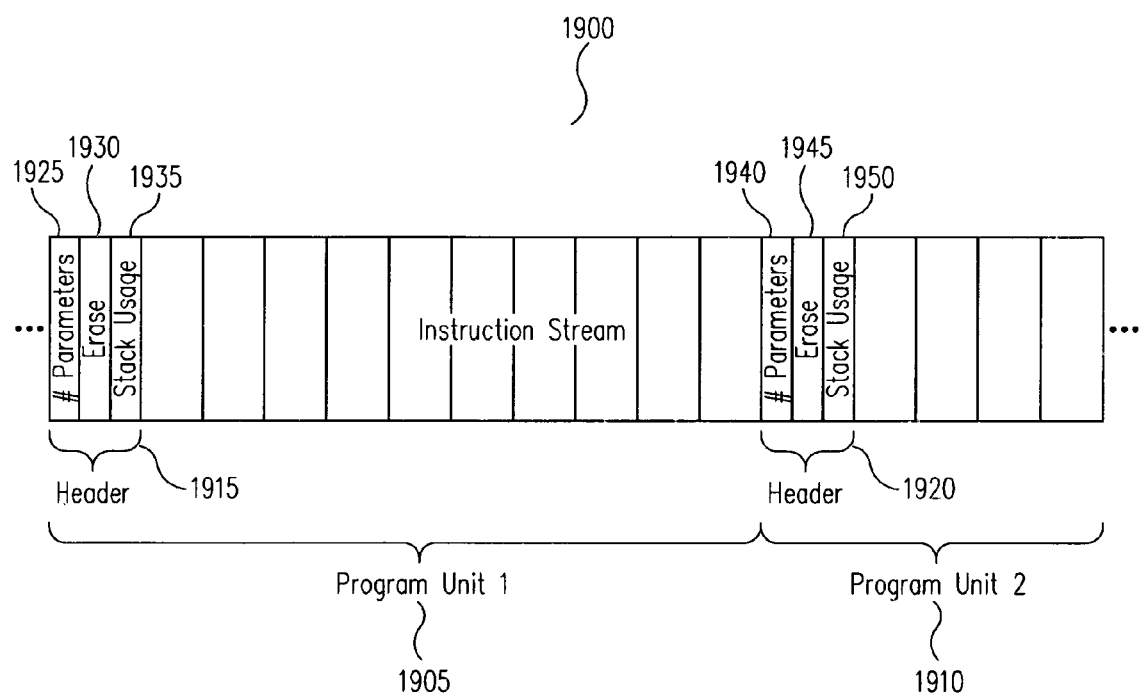
FIG. 19 is a block diagram that illustrates an instruction stream comprising one or more program units having a header, in accordance with one embodiment of the present invention.

Turning now to FIG. 19, a block diagram that illustrates an instruction stream 1900 including one or more program units 1905, 1910, which each have a header 1915, 1920, in accordance with one embodiment of the present invention, is presented. Headers 1915, 1920 are one example of headers that are used in operations 1800, 1805, 1810 of FIG. 18, and operations 815 and 825 of FIG. 8.

As shown in FIG. 19, unrestricted instruction stream 1900 includes program unit 1 (1905) having header 1915, and program unit 2 (1910) having header 1920. Header 1915 includes information for use in determining whether successful execution of program unit 1 (1905) is possible. Likewise, header 1920 includes information 1940, 1945, 1950 for use in determining whether successful execution of program unit 2 (1910) is possible. As shown in FIG. 19, header 1915 includes a number of parameters indicator 1925, an erasure indicator 1930, and a data stack usage indicator 1935. Header 1920 includes a number of parameters indicator 1940, an erasure indicator 1945, and a data stack usage indicator 1950.

Number of parameters indicator 1925 indicates the number of parameters that are obtained from the data stack during execution of program unit 1 (1905). Thus, if number of parameters indicator 1925 has a value of five and the number of storage units including parameters present on the data stack upon calling program unit 1 (1905) is less than five, an error indication may be made. This determination is made, for example, by comparing the current data stack pointer with the current data stack bottom.

Data stack usage indicator 1935 indicates the amount of data stack memory required to complete execution of program unit 1 (1905). Thus, if the amount of data stack memory required to complete execution of program unit 1 (1905) is ten storage units and there are less than ten storage units remaining on the empty part of the data stack, an error indication may be made.

If program units that form part of an unrestricted instruction stream share a merged data stack with program units that form part of a restricted instruction stream, it is possible during the life of a program that the same data stack memory used by a program unit that forms part of an unrestricted instruction stream is later made accessible to a program unit that forms part of a restricted instruction stream. The erasure indicator 1930 indicates whether data stack memory used by program unit 1 (1905) should be erased after execution of program unit 1 (1905). Erasing data stack memory used by a program unit that is part of an unrestricted instruction stream thus prevents a program unit that is part of a restricted instruction stream from accessing data previously used by a program unit that is part of an unrestricted instruction stream.

Although FIG. 19 has been illustrated showing a single program unit associated with a single program unit header, one or more program units in an instruction stream may be associated with a "combined" program unit header. The content of a combined program unit header includes information regarding the one or more program units associated with the header. According to one embodiment of the present invention, a combined program unit header includes information regarding all program units that are called directly or indirectly by program units associated with the combined program unit header.

Also, although FIG. 19 has been illustrated showing a program unit header prepended to the non-header portion of the program unit described by the program unit header, a program unit header and the non-header portion of its associated program unit may be noncontiguous, provided the program unit header is loaded prior to execution of the associated non-header portion of the program unit. Furthermore, the type of information stored within headers of program units in the same instruction stream may differ.

Figure 20:
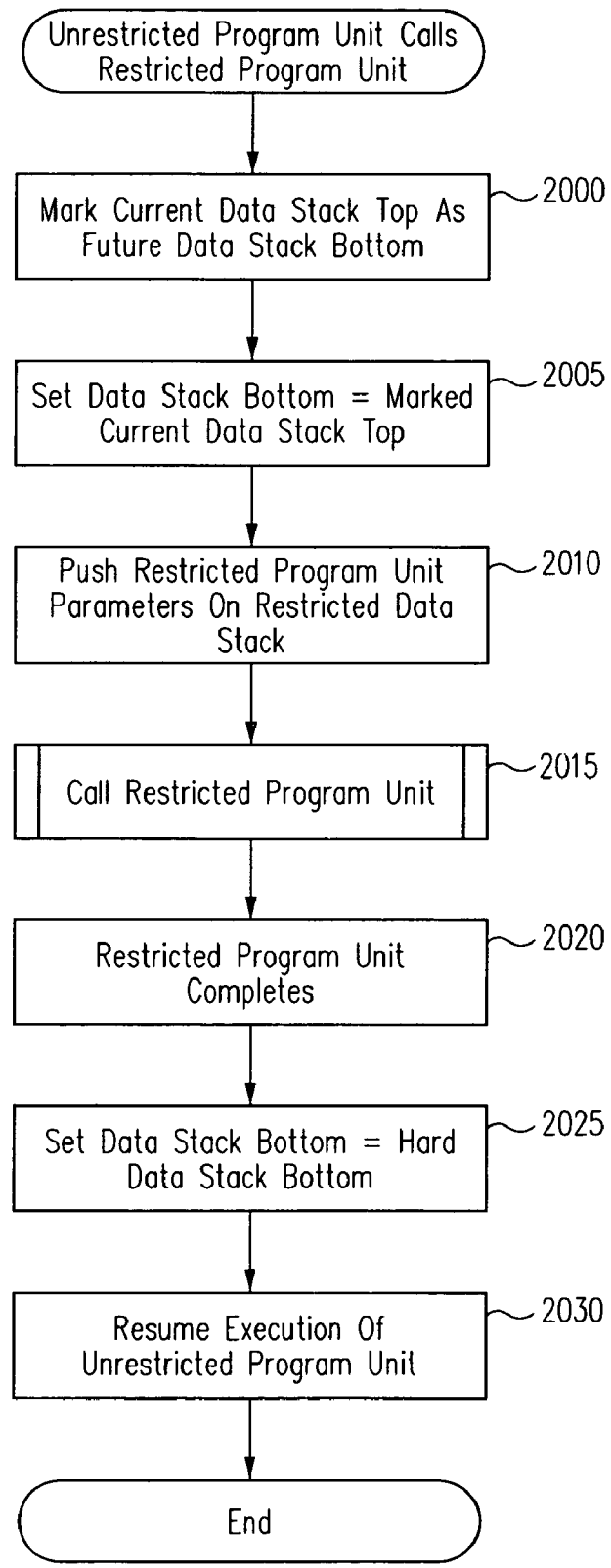
FIG. 20 is a flow diagram that illustrates a method for an unrestricted program unit calling a restricted program unit, in accordance with one embodiment of the present invention.

Turning now to FIG. 20, a flow diagram that illustrates a method for an unrestricted program unit calling a restricted program unit, in accordance with one embodiment of the present invention, is presented. The processes illustrated in FIG. 20 may be implemented in hardware, software, firmware, or a combination thereof. At mark operation 2000, the current data stack top is marked as the future data stack bottom. At set operation 2005, the data stack bottom is set to the marked current data stack top. At push operation 2010, zero or more restricted program unit parameters are pushed on the restricted data stack. At call operation 2015, the restricted program unit is called. At operation 2020, the restricted program unit completes. At set operation 2025, the data stack bottom is set to the hard data stack bottom. At resume operation 2030, execution is transitioned to the unrestricted program unit. The unrestricted program unit may be transitioned to by executing a "return" instruction or a "goto finish" instruction.

Figure 21:
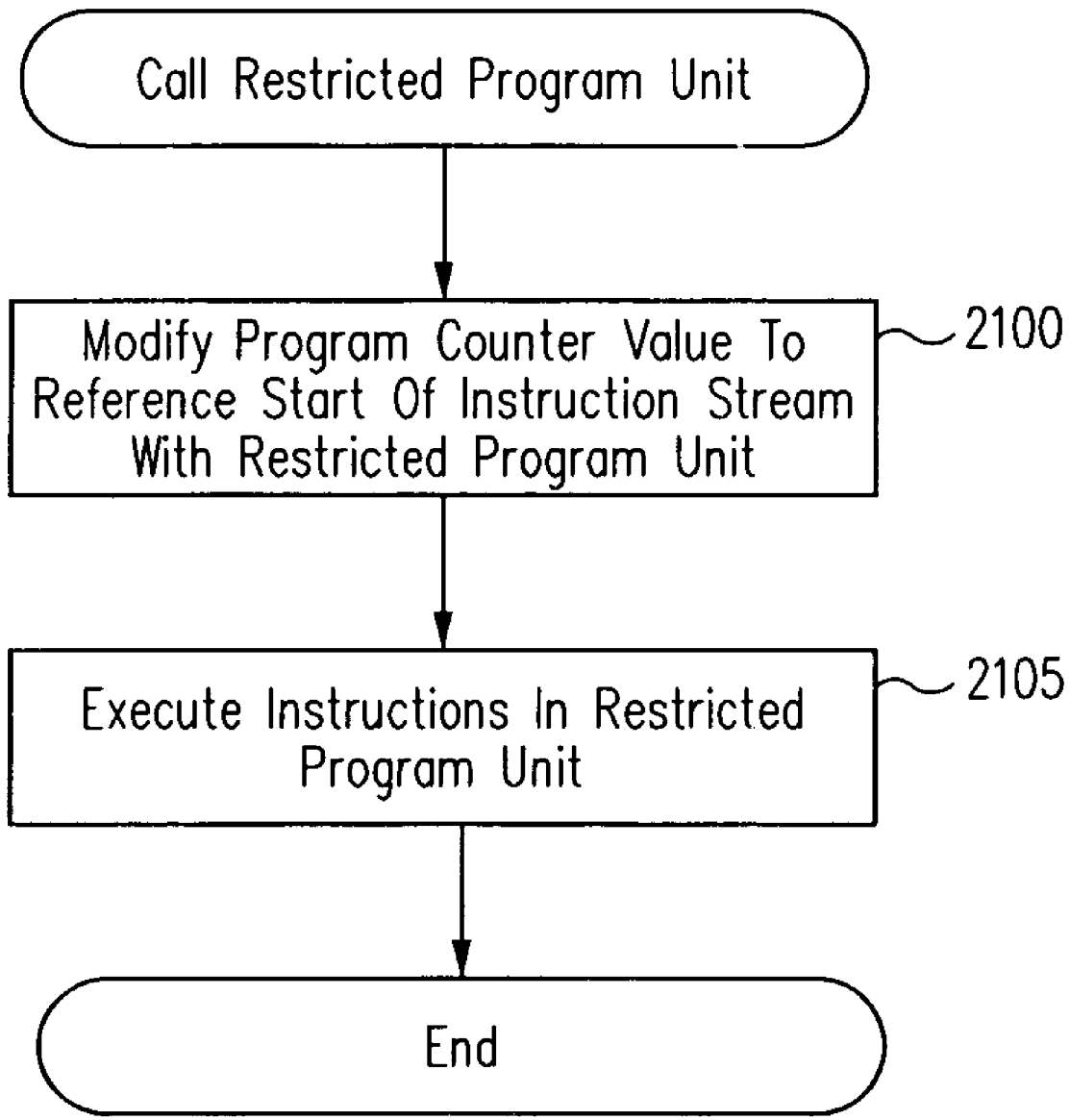
FIG. 21 is a flow diagram that illustrates a method for calling a restricted program unit, in accordance with one embodiment of the present invention.

Turning now to FIG. 21, a flow diagram that illustrates a method for calling a restricted program unit, in accordance with one embodiment of the present invention, is presented with FIG. 21 provides more detail for call operation 2015. The processes illustrated in FIG. 21 may be implemented in hardware, software, firmware, or a combination thereof. At modify operation 2100, the program counter value is modified to reference the start of the instruction stream with the restricted program unit. At execute operation 2105, the instructions in the restricted program unit are executed.

FIGS. 22-28 illustrate streams, structures and methods for dynamic instructions, in accordance with embodiments of the present invention. A dynamic instruction includes an opcode and zero or more operands. The opcode is defined by an opcode coding having a dynamic portion and a static portion. The static portion determines an instruction implementation. The dynamic portion determines the operation of the instruction implementation.

According to one embodiment of the present invention, the static portion determines an instruction implementation that modifies a program counter value based at least in part on a program unit reference table, and the dynamic portion determines the entry in the table that is used to modify the program counter value. This is explained in more detail below.

Figure 22:
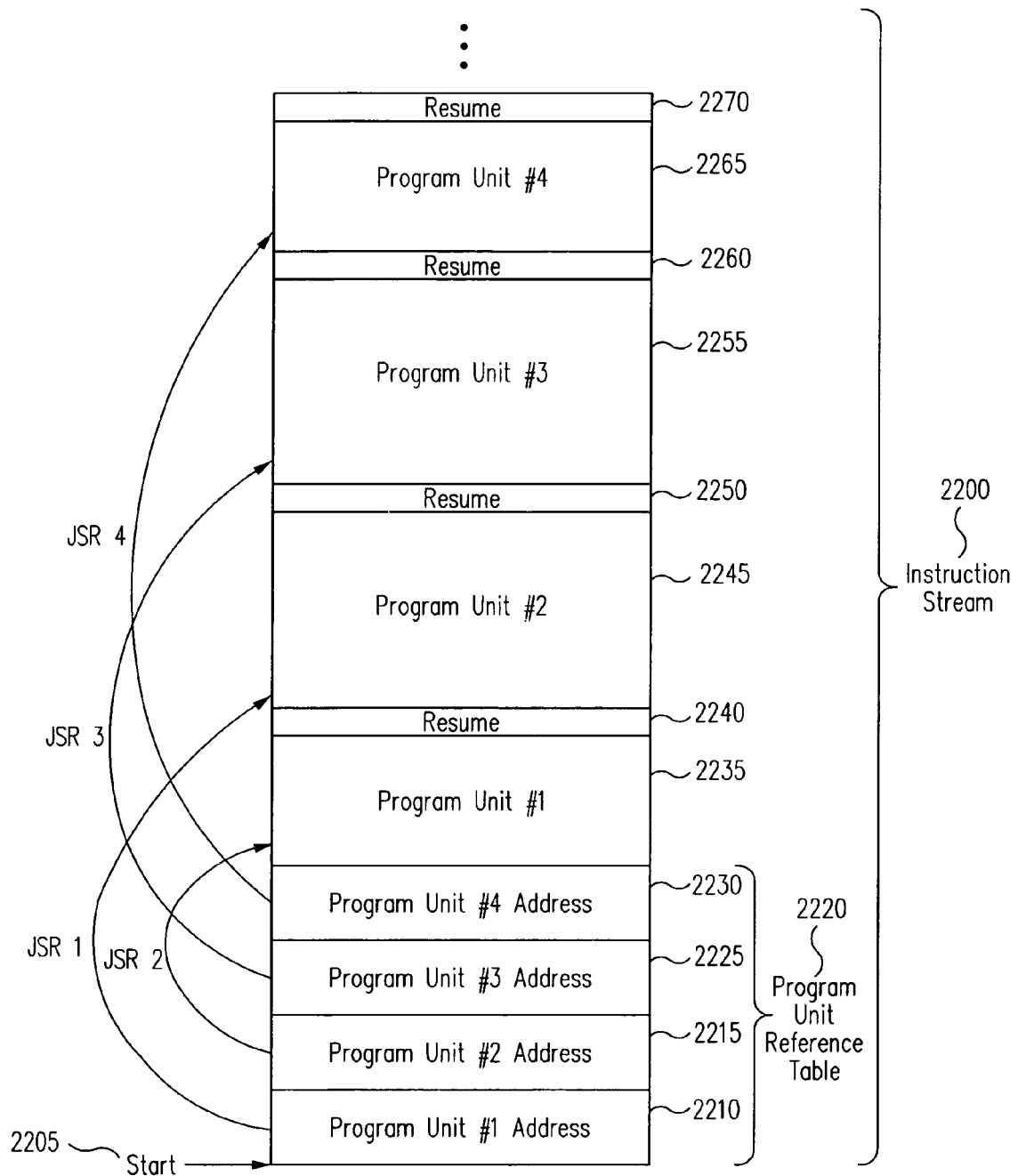
FIG. 22 is a block diagram that illustrates an instruction stream comprising a program unit reference table, in accordance with one embodiment of the present invention.

Turning now to FIG. 22, a block diagram that illustrates an instruction stream including a program unit reference table, in accordance with one embodiment of the present invention, is presented. Instruction stream 2200 includes a program unit reference table 2220 at the start of the instruction stream 2200, and is followed by one or more program units (2235, 2245, 2255, and 2265). Program unit reference table 2220 includes one or more entries (2210, 2220, 2225, and 2230) that reference the one or more program units (2235, 2245, 2255, and 2265). As shown in FIG. 22, each of entries 2210, 2220, 2225, and 2230 includes an address of one of the one or more program units (2235, 2245, 2255, and 2265). In more detail, entries 2210, 2220, 2225, and 2230 include the address of program units 2245, 2235, 2255, and 2265, respectively. An address used as a reference may include an absolute address or a relative address.

According to one embodiment of the present invention, an unrestricted instruction stream includes one or more program unit reference tables. According to another embodiment of the present invention, a restricted instruction stream includes one or more program unit reference tables.

According to one embodiment of the present invention, a program unit reference table in an unrestricted instruction stream includes one or more references to one or more program units, where the one or more references are absolute addresses.

According to another embodiment of the present invention, a program unit reference table in a restricted instruction stream includes one or more references to one or more program units, where the one or more references are relative addresses.

According to one embodiment of the present invention, the coding for an opcode of a "Jump" instruction utilizes at least one bit of the opcode coding as a reference to a program unit reference table 2220 entry. The number of bits allocated as a reference to a program unit reference table entry determines a maximum number of entries in the program unit reference table.

As shown in FIG. 22, the values "1", "2", "3", and "4" refer to entries 2210, 2215, 2225, and 2230, respectively. By way of example, suppose an 8-bit opcode "Jump" instruction has the binary value of 101110xx, where an "xx" indicates two bits that may be used to determine which program unit reference table entry is referenced when the instruction is executed. In one possible coding, the opcode codings 10111000, 10111001, 10111010, and 10111011 refer to program unit reference table entries 2210, 2215, 2225, and 2230, respectively. In more detail, execution of instructions having opcode encodings 10111000, 10111001, 10111010, and 10111011 perform a jump to the start of program units 2 (2245), 1 (2235), 3 (2255), and 4 (2265), respectively.

According to one embodiment of the present invention, four bits are allocated for the opcode portion of an instruction coding, and the maximum number of entries in a program unit reference table is sixteen. Those of ordinary skill in the art recognize that other mappings are possible.

According to another embodiment of the present invention, a program unit reference table precedes collocated program units in an instruction stream. By way of example, a collection of ten collocated program units in an instruction stream may be preceded by a program unit reference table including one or more references to the ten collocated program units.

According to another embodiment of the present invention, a program unit reference table reflects the hierarchical relationship between program units. By way of example, a program unit reference table including one or more references to one or more lower level program units associated with higher level program units may precede the lower level program units in an instruction stream. As a further example, a program unit reference table including one or more references to methods in a class may precede the methods in an instruction stream.

According to one embodiment of the present invention, the instruction stream preceded by a program unit reference table is an unrestricted instruction stream. According to another embodiment of the present invention, the instruction stream preceded by a program unit reference table is a restricted instruction stream.

According to another embodiment of the present invention, the entries in a program unit reference table reference one or more program units ordered, configured, or arranged based at least in part on the frequency of use of the one or more program units. This is explained in more detail below with reference to FIGS. 23-26.

Figure 23:
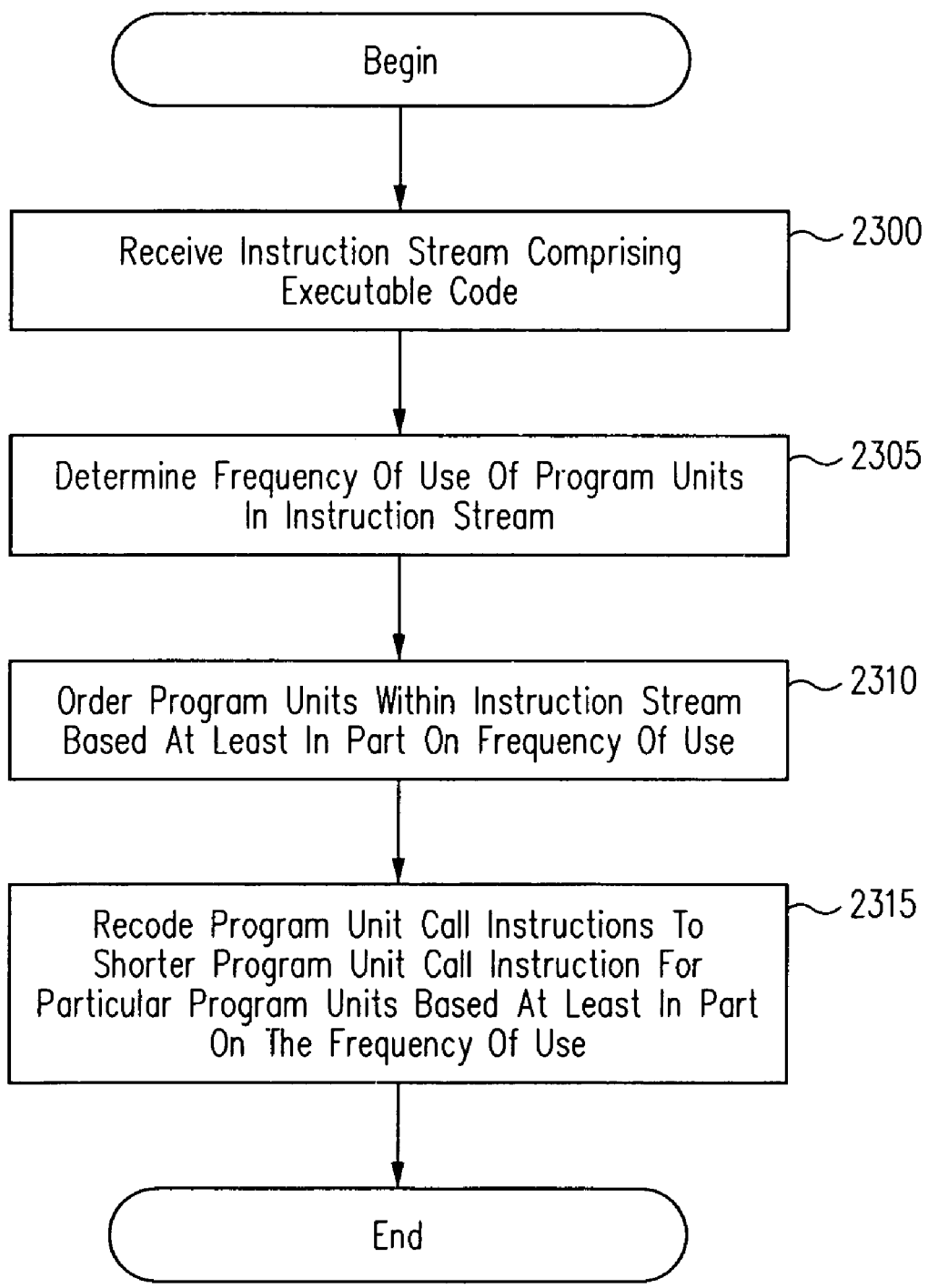
FIG. 23 is a flow diagram that illustrates a method for configuring program units within an instruction stream for execution using a jump instruction that references a program unit reference table to obtain a reference to the start of a program unit to execute, in accordance with one embodiment of the present invention.

Turning now to FIG. 23, a flow diagram that illustrates a method for configuring program units within an instruction stream for execution using a jump instruction that references a program unit reference table to obtain a reference to the start of a program unit to execute, in accordance with one embodiment of the present invention, is presented. The processes illustrated in FIG. 23 may be implemented in hardware, software, firmware, or a combination thereof. At receive operation 2300, an instruction stream including executable code is received. At determine operation 2305, the frequency of use of program units in an instruction stream is determined. The frequency of use may be determined based upon an analysis of one or more executions of a program or part of a program including the instruction stream. By way of example, the frequency analysis may be performed over an entire program, or over the program portion that includes the instruction stream.

The frequency of use may also be estimated based on analysis of the program code. By way of example, the frequency of use may be estimated based at least in part on a number of call sites (the number of places in an instruction stream where a program unit may be called) for a program unit. Program units that have a relatively high number of call sites are accorded a relatively high estimated frequency of use with respect to program units that have a relatively low number of call sites.

According to one embodiment of the present invention, an instruction stream is associated with an object of a package, where all the methods or program units in the package are included in a single restricted instruction stream, and all the methods or program units are defined in a table or ordered in the table, with the most frequently used ones in the first part.

According to another embodiment of the present invention, a program unit reference table is associated with an object. Those of ordinary skill in the art recognize that a program unit reference table may be associated with other groupings of program code, program data, or both.

Still referring to FIG. 23, at order operation 2310 the program units in the instruction stream are ordered in the instruction stream based at least in part on frequency of use. According to one embodiment of the present invention, the program units in the instruction stream are ordered in the instruction stream by decreasing frequency of use. By way of example, the most frequently used program unit is positioned relatively early in the instruction stream with respect to the corresponding program unit reference table, and the least frequently used program unit is positioned relatively late in the instruction stream with respect to the corresponding program unit reference table. At recode operation 2315, program unit call instructions in the instruction stream are recoded to use a shorter program unit call instruction, sometimes referred to as a short program unit call instruction, for particular program units based at least in part on the frequency of use. According to one embodiment of the present invention, program unit call instructions in the instruction stream are recoded to use a shorter program unit call instruction for the most frequently used program units. Thus, the program unit call instructions in the instruction stream are recoded to use an optimized program unit call instruction to call program units used more frequently. The recoding generates a modified instruction stream that is stored for execution on a resource-constrained device.

Figure 24:
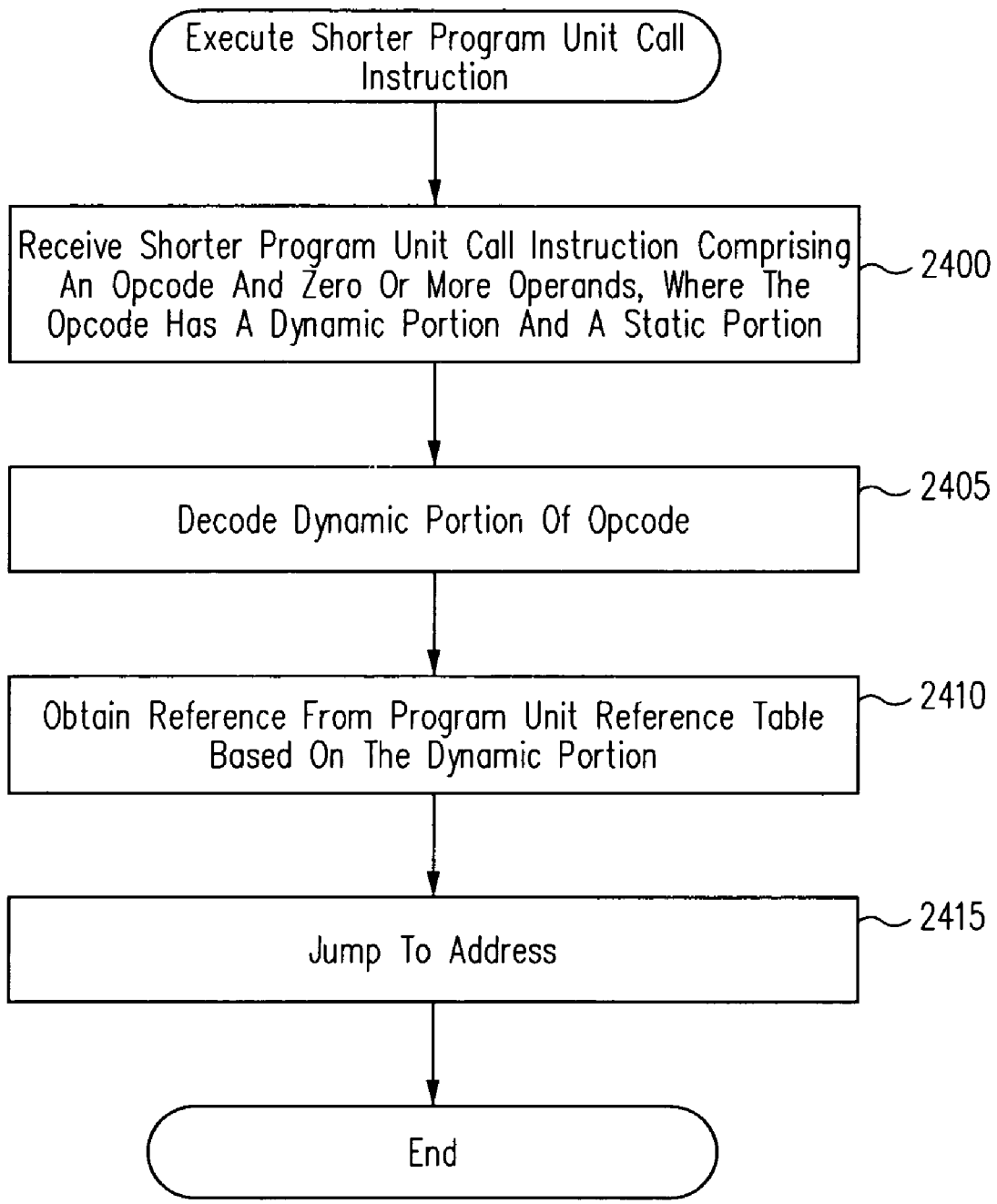
FIG. 24 is a flow diagram that illustrates a method for executing a shorter program unit call instruction, in accordance with one embodiment of the present invention.

Turning now to FIG. 24, a flow diagram that illustrates a method for executing a short program unit call instruction, in accordance with one embodiment of the present invention, is presented. The processes illustrated in FIG. 24 may be implemented in hardware, software, firmware, or a combination thereof. At receive operation 2400, a short program unit call instruction is received. The short program unit call instruction includes an opcode and zero or more operands. The opcode includes a static portion and a dynamic portion. At decode operation 2405, the dynamic portion of the instruction is decoded. At obtain reference operation 2410, a reference to the start of the called program unit is obtained from a program unit reference table based at least in part on the dynamic portion. At set operation 2415, the program counter value is set to the address value corresponding to the reference obtained at operation 2410.

Figure 25:
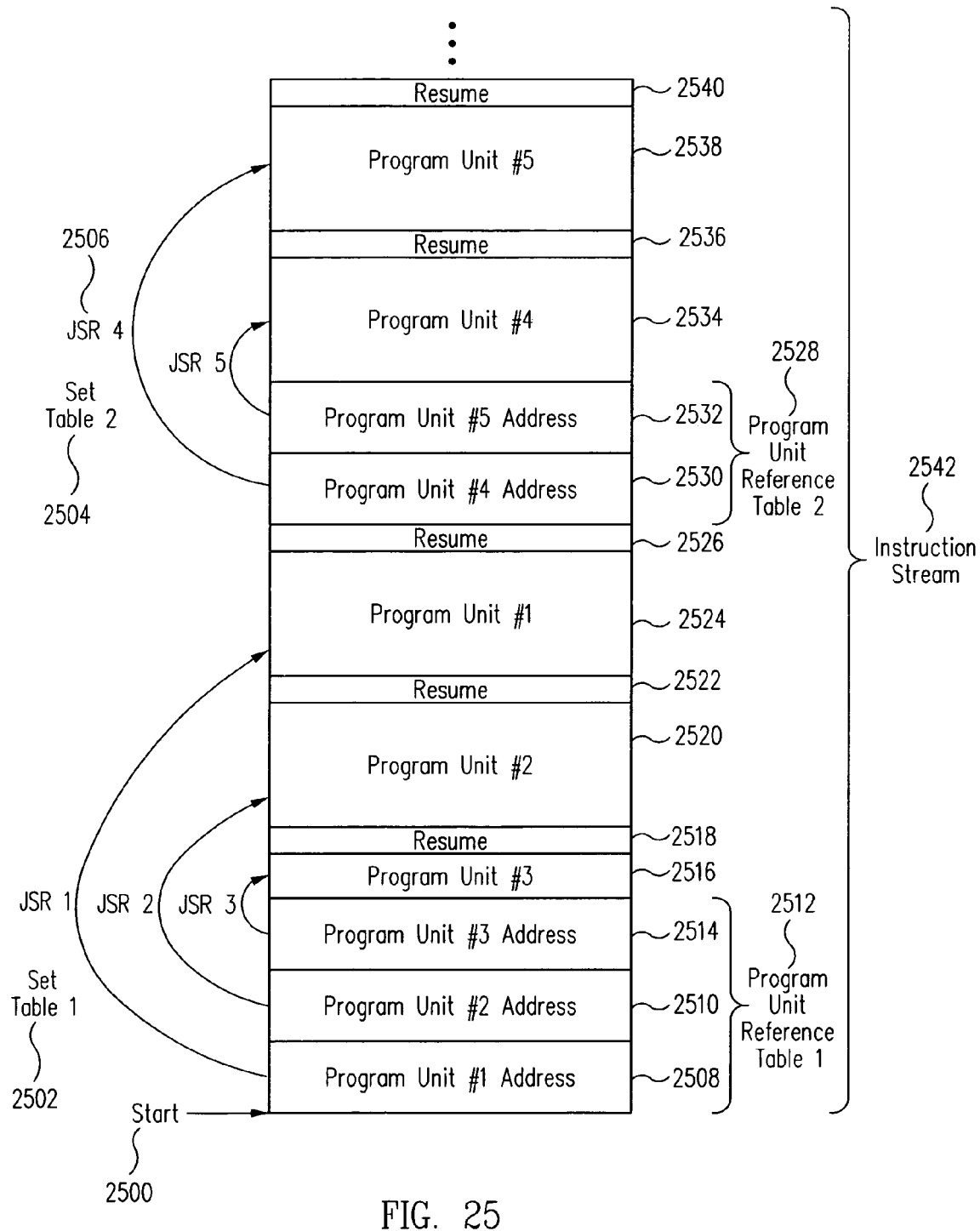
FIG. 25 is a block diagram that illustrates an instruction stream comprising multiple program unit reference tables, in accordance with one embodiment of the present invention.

Turning now to FIG. 25, a block diagram that illustrates an instruction stream 2542 including multiple program unit reference tables 2512, 2528, in accordance with one embodiment of the present invention, is presented. Program unit reference table 2512 is located at the start of the instruction stream 2542 and before program units 2516, 2520 and 2524. Program unit reference table 2528 is located after program units 2516, 2520 and 2524, and before program units 2534 and 2538.

Program unit reference table 2512 includes one or more references (2508, 2510, and 2514) to the one or more program units (2516, 2520, and 2524). As shown in FIG. 25, references

2508, 2510, and 2516 of program unit reference table 2512 include the address of program units 2524, 2520, and 2516, respectively. References 2530 and 2532 of program unit reference table 2528 include the address of program units 2538 and 2534, respectively. An address used as a reference may include an absolute address or a relative address.

According to one embodiment of the present invention, an unrestricted instruction set includes an instruction configured to set a current program unit reference table. Using FIG. 25 as an example, such an instruction may be used to set the current program unit reference table to table 2512 before execution of program units 2516, 2520, or 2524. Likewise, the instruction may be used to set the current program unit reference table to table 2528 before execution of program units 2534 or 2538.

Figure 26:
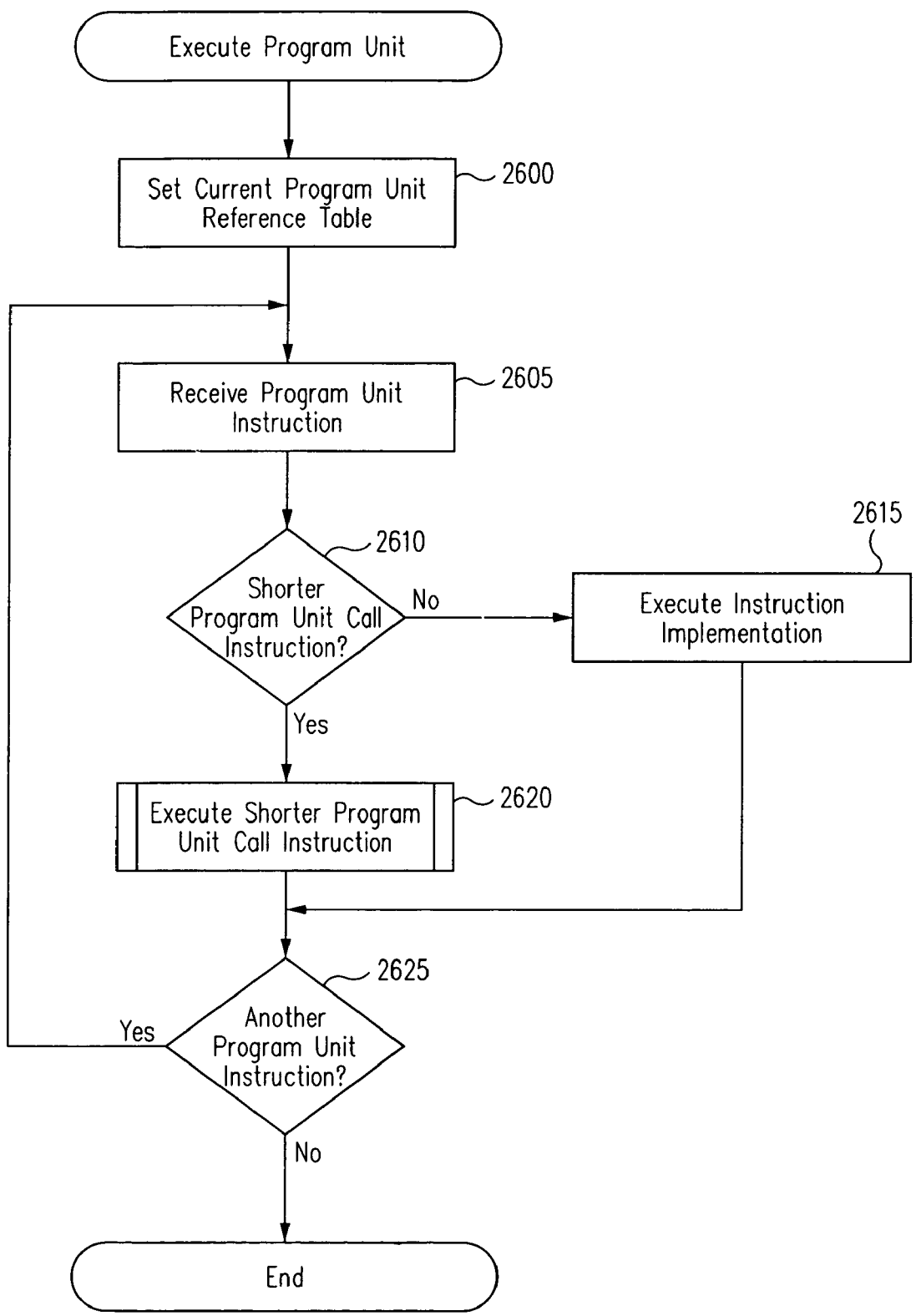
FIG. 26 is a flow diagram that illustrates a method for executing a program unit, in accordance with one embodiment of the present invention.

Turning now to FIG. 26, a flow diagram that illustrates a method for executing a program unit, in accordance with one embodiment of the present invention, is presented. The processes illustrated in FIG. 26 may be implemented in hardware, software, firmware, or a combination thereof. At set operation 2600, the current program unit reference table is set. The current program unit reference table may be set based at least in part on one or more program units to be executed. By way of example, if a currently executing program unit associated with a first program unit reference table calls another program unit associated with a second program unit reference table, the call to the other program unit may be preceded by changing the current program unit reference table to the program unit reference table associated with the other program unit. At receive operation 2605, a program unit instruction is received. At check operation 2610, a determination is made whether the program unit instruction is a shorter program unit call instruction, where at least one of the bits in the opcode coding of the instruction determines a program unit reference table entry. If the program unit instruction is not a shorter program unit call instruction, the instruction implementation is executed at execute operation 2615. If the program unit instruction is a shorter program unit call instruction, the shorter program unit call instruction is executed at execute operation 2620. At check operation 2625, a determination is made whether there is another program unit instruction. If there is another program unit instruction, it is processed beginning at receive operation 2605.

FIGS. 27 and 28 illustrate instruction dispatch tables associated with an instruction set including one or more dynamic instructions, in accordance with embodiments of the present invention. The instruction dispatch table illustrated in FIG. 27 is associated with a restricted instruction set. The instruction dispatch table illustrated in FIG. 28 is associated with an unrestricted instruction set.

Turning now to FIG. 27, a block diagram that illustrates an instruction dispatch table associated with a restricted instruction set including one or more dynamic instructions, in accordance with one embodiment of the present invention, is presented. As shown in FIG. 27, dispatch table 2705 includes a first portion 2725 including one or more entries for a first dynamic instruction, and a second portion 2730 including one or more entries for a second dynamic instruction. A static portion of an opcode coding determines whether the opcode is associated with the first dynamic instruction, the second dynamic instruction, or another instruction. As shown in FIG. 27, an opcode having a static portion of "101" is associated with the first dynamic instruction, and an opcode having a static portion of "100" is associated with the second dynamic instruction. Those of ordinary skill in the art recognize that other mappings are possible.

Still referring to FIG. 27, a dynamic portion of an opcode coding for the first dynamic instruction references an entry in an unrestricted access mode table 2710. According to one embodiment of the present invention, the unrestricted access mode table 2710 includes an entry points table. As shown in FIG. 27, an entry in the entry points table included in unrestricted access mode table 2710, references the start of a program unit in an instruction stream 2715. The number of bits used for the dynamic portion determines a maximum number of entries for the unrestricted entry points table. A dynamic portion of an opcode coding for the second dynamic instruction references the start of a program unit in a restricted instruction stream 2720. The dynamic portion determines a maximum number of references. According to another embodiment of the present invention, the unrestricted access mode table 2710 includes a call points table.

Turning now to FIG. 28, a block diagram that illustrates an instruction dispatch table associated with an unrestricted instruction set including one or more dynamic instructions, in accordance with one embodiment of the present invention, is presented. FIG. 28 is similar to FIG. 27, except FIG. 28 has no dynamic instructions that reference an unrestricted access table. As shown in FIG. 28, dispatch table 2805 includes a first portion 2850 including one or more entries for a first dynamic instruction, and a second portion 2825 including one or more entries for a second dynamic instruction. A static portion of an opcode coding determines whether the opcode is associated with the first dynamic instruction, the second dynamic instruction, or another instruction. As shown in FIG. 28, an opcode having a static portion of "101" is associated with the first dynamic instruction, and an opcode having a static portion of "100" is associated with the second dynamic instruction. Those of ordinary skill in the art recognize that other mappings are possible.

FIGS. 27 and 28 also illustrate using a particular opcode encoding to call a restricted mode program unit from both restricted mode and unrestricted mode. As shown in FIG. 27, shared instruction set 2700 includes dynamic instructions with the static portion of the opcode equal to "101". Instructions in the shared instruction set 2700 are implemented in an unrestricted instruction stream 2715 and are called via an unrestricted access mode table 2710. FIG. 28 illustrates implementing the same shared instruction set 2855, except that the same instructions that implement the shared instruction set 2855 are called directly, thus using the same executable code for the same functionality.

Still referring to FIG. 28, a dynamic portion of an opcode coding for the dynamic instruction references the start of a program unit in an instruction stream 2820. The size of the dynamic portion or the number of bits in the instruction determines a maximum number of references.

While embodiments and applications of this invention have been shown and described, it is apparent to those skilled in the art having the benefit of this disclosure that many more modifications than mentioned above are possible without departing from the inventive concepts herein. The invention, therefore, is not to be restricted except in the spirit of the appended claims.

For example, one embodiment includes a Multiple Instruction Execution Mode Resource-Constrained Device Using A Merged Data Stack that in turn includes:

A1. A memory for storing data for access by an application program being executed on a resource-constrained device, comprising:
 a data structure stored in said memory, said data structure including information used by said resource-constrained device to execute said application program, said data structure comprising a single data stack comprising an unrestricted portion and a restricted portion, said unrestricted portion for use as a data stack by an unrestricted instruction stream executing in an unrestricted instruction execution mode, said restricted portion for use as a data stack by one or more restricted instruction streams executing in a restricted instruction execution mode, each of said instruction streams comprising a plurality of instructions, each of said instruction execution modes associated with an instruction set comprising a plurality of instructions, at least one of said plurality of instructions configured to change from a first instruction execution mode to a second instruction execution mode.

A2. The memory of example A1 wherein
    said unrestricted portion is delineated by a hard data stack bottom reference and a shared current data stack bottom reference; and
    said restricted portion is delineated by said shared current data stack bottom reference and a top of data stack reference.

A3. A method for determining whether a data stack is empty, said data stack comprising an unrestricted portion and a restricted portion, said unrestricted portion for use as a data stack by an unrestricted instruction stream executing in an unrestricted instruction execution mode, said restricted portion for use as a data stack by one or more restricted instruction streams executing in a restricted instruction execution mode, each of said instruction streams comprising a plurality of instructions, each of said instruction execution modes associated with an instruction set comprising a plurality of instruction implementations, said unrestricted portion delineated by a hard data stack bottom reference and a shared current data stack bottom reference, said restricted portion delineated by said shared current data stack bottom reference and a top of data stack reference, said method comprising:
    if a current instruction execution mode comprises said unrestricted instruction execution mode,
        indicating said data stack is empty if a current data stack pointer matches a hard data stack bottom; and
        indicating said data stack is not empty if said current data stack pointer does not match said hard data stack bottom; and
    if said current instruction execution mode comprises said restricted instruction execution mode,
        indicating said data stack is empty if said current data stack pointer matches a current shared data stack bottom; and
        indicating said data stack is not empty if said current data stack pointer does not match said current shared data stack bottom.

A4. A method for determining whether a data stack is empty, said data stack comprising an unrestricted portion and a restricted portion, said unrestricted portion for use as a data stack by an unrestricted instruction stream executing in an unrestricted instruction execution mode, said restricted portion for use as a data stack by one or more restricted instruction streams executing in a restricted instruction execution mode, each of said instruction streams comprising a plurality of instructions, each of said instruction execution modes associated with an instruction set comprising a plurality of instruction implementations, said unrestricted portion delineated by a hard data stack bottom reference and a shared current data stack bottom reference, said restricted portion delineated by said shared current data stack bottom reference and a top of data stack reference, said method comprising:
    indicating said data stack is empty if a current data stack pointer matches said current shared data stack bottom; and
    indicating said data stack is not empty if said current data stack pointer does not match said shared current data stack bottom.

Thus, in this example, a resource-constrained device includes a processor configured to execute multiple instruction streams comprising multiple instructions having an opcode and zero or more operands. Each of the instruction streams is associated with one of multiple instruction execution modes having an instruction set comprising multiple instruction implementations. The processor includes an instruction fetcher configured to fetch an instruction from one of the multiple instruction streams based at least in part upon a current instruction execution mode. The resource-constrained device also includes a first memory having an unrestricted instruction stream and the multiple instruction implementations; a second memory including one or more restricted instruction streams; and a third memory including a data stack pointer, a shared current data stack bottom indicator, a data stack referenced by the current data stack bottom indicator and the data stack pointer, a hard data stack bottom indicator, an unrestricted program counter, and one or more restricted program counters.

For example, one embodiment includes a Multiple Instruction Execution Mode Resource-Constrained Device Using An Interleaved Data Stack that in turn includes:
    B1. A memory for storing data for access by an application program being executed on a resource-constrained device, comprising:
        a data structure stored in said memory, said data structure including information used by said resource-constrained device to execute said application program, said data structure comprising a single data stack comprising an unrestricted portion and a restricted portion, said unrestricted portion for use as a data stack by an unrestricted instruction stream executing in an unrestricted instruction execution mode, said restricted portion for use as a data stack by one or more restricted instruction streams executing in a restricted instruction execution mode, each of said instruction streams comprising a plurality of instructions, each of said instruction execution modes associated with an instruction set comprising a plurality of instructions, at least one of said plurality of instructions configured to change from a first instruction execution mode to a second instruction execution mode, one or more portions of said unrestricted portion interleaved with one or more portions of said restricted portion for nested calls between said unrestricted instruction execution mode and said restricted instruction execution mode.
    B2. A method for executing a program on a resource-constrained device, comprising:
        storing an indication of a restricted data stack bottom on the bottom of an unrestricted data stack if a restricted program unit calls an unrestricted program unit;
        calling said unrestricted program unit;
        restoring said restricted data stack bottom from said bottom of said unrestricted data stack upon completion of said unrestricted program unit; and
        resuming execution of said restricted program unit.

B3. The method of example B2 wherein said calling further comprises:
  modifying a program counter value to reference the start of an instruction stream with the unrestricted program unit; and
  executing the instructions in the unrestricted program unit.

B4. The method of example B3, further comprising, if said unrestricted program unit is associated with a header:
  determining whether the number of fields on a data stack is sufficient for execution of said program unit; and
  determining whether sufficient room exists on an empty part of said data stack to complete execution of said program unit.

B5. The method of example B5, further comprising, if said unrestricted program unit is associated with a header, erasing data stack memory used by said program unit after execution of said program unit.

B6. A method for executing a program on a resource-constrained device, comprising:
  marking a current data stack top as a future data stack bottom;
  setting a data stack bottom to said current data stack top;
  pushing one or more restricted program unit parameters on a restricted data stack if an unrestricted program unit calls a restricted program unit;
  calling said restricted program unit;
  setting said data stack bottom to a hard data stack bottom; and
  resuming execution of said unrestricted program unit upon completion of said restricted program unit.

B7. The method of example B6 wherein said calling further comprises:
  modifying a program counter value to reference the start of an instruction stream with the restricted program unit; and
  executing the instructions in the unrestricted program unit.

B8. A program storage device readable by a machine, embodying a program of instructions executable by the machine to perform a method for executing a program on a resource-constrained device, the method comprising:
  marking a current data stack top as a future data stack bottom;
  setting a data stack bottom to said current data stack top;
  pushing one or more restricted program unit parameters on a restricted data stack if an unrestricted program unit calls a restricted program unit;
  calling said restricted program unit;
  setting said data stack bottom to a hard data stack bottom; and
  resuming execution of said unrestricted program unit upon completion of said restricted program unit.

B9. The program storage device of example B8 wherein said calling further comprises:
  modifying a program counter value to reference the start of an instruction stream with the restricted program unit; and
  executing the instructions in the unrestricted program unit.

Thus, in this example, a resource-constrained device includes a processor configured to execute multiple instruction streams having multiple instructions, each instruction, in turn, having an opcode and zero or more operands. Each instruction stream is associated with one of multiple instruction execution modes having an instruction set including multiple instruction implementations. The processor includes an instruction fetcher configured to fetch an instruction from one of the plurality of instruction streams based at least in part upon a current instruction execution mode. A single data stack includes an unrestricted portion for use as a data stack by an unrestricted instruction stream executing in an unrestricted instruction execution mode, and a restricted portion for use as a data stack by one or more restricted instruction streams executing in a restricted instruction execution mode. One or more portions of the unrestricted portion may be interleaved with one or more portions of the restricted portion for nested calls between execution modes.

What is claimed is:

1. A resource-constrained device comprising:
  a processor configured to execute a plurality of instruction streams, each of said plurality of instruction streams comprising a plurality of instructions, wherein each instruction comprises an opcode and zero or more operands, each of said plurality of instruction streams associated with one of a plurality of instruction execution modes having an instruction set comprising a plurality of instruction implementations, at least one of said plurality of instruction implementations configured to change said first processor from a first instruction execution mode to a second instruction execution mode, said processor comprising an instruction fetcher configured to fetch an instruction from one of said plurality of instruction streams based at least in part upon a current value of an instruction execution mode indicator,
  wherein said plurality of instruction streams includes a restricted instruction steam and an unrestricted instruction stream;
  said restricted instruction stream and said unrestricted instruction stream comprise a shared instruction subset, said shared instruction subset comprising at least one instruction shared between said restricted instruction stream and said unrestricted instruction stream, each instruction in a shared instruction subset having the same instruction coding for said restricted instruction stream and said unrestricted instruction stream;
  the resource-constrained device further comprising:
  a data stack pointer;
  a shared current data stack bottom pointer;
  a data stack referenced by said shared current data stack bottom pointer and said data stack pointer;
  a hard data stack bottom pointer;
  an unrestricted program counter;
  one or more restricted program counters; and
  a top of data stack reference wherein an unrestricted portion of said data stack is delineated by said hard data stack bottom pointer and said shared current data stack bottom pointer, and a restricted portion of said data stack is delineated by said shared current data stack bottom pointer and said top of data stack reference.

2. The resource-constrained device of claim 1 wherein at least one instruction in said first instruction execution mode is implemented as an instruction stream of said second instruction execution mode.

3. The resource-constrained device of claim 1, further comprising:
  at least one memory storing instruction data associated with said plurality of instruction streams.

4. The resource-constrained device of claim 3 wherein said instruction data comprises said current value of said instruction execution mode indicator and at least one data stack.

5. The resource-constrained device of claim 4 wherein said at least one data stack comprises:

a single interleaved data stack further comprising:
an unrestricted portion; and
a restricted portion,
   wherein said unrestricted portion is for use as a data stack by an unrestricted instruction stream executing in an unrestricted instruction execution mode; and
   said restricted portion is for use as a data stack by one or more restricted instruction streams executing in a restricted instruction execution mode, one or more portions of said unrestricted portion interleaved with one or more portions of said restricted portion for nested calls between said unrestricted instruction execution mode and said restricted instruction execution mode.

6. The resource-constrained device of claim 1 further comprising at least one memory storing said plurality of instruction streams.

7. The resource-constrained device of claim 6 wherein at least one memory comprises a first memory and a second memory and further wherein said plurality of instruction streams comprises:
   the unrestricted instruction stream stored in said first memory; and
   at least the restricted instruction stream, having fewer privileges than said unrestricted instruction stream, stored in said second memory.

8. The resource-constrained device of claim 1, further comprising:
   an unrestricted data stack pointer;
   one or more restricted data stack pointers;
   an unrestricted data stack referenced by said unrestricted data stack pointer;
   one or more restricted data stacks referenced by said one or more restricted data stack pointers.

9. The resource-constrained device of claim 1 wherein said processor comprises a virtual machine.

10. The resource-constrained device of claim 1 wherein said resource-constrained device comprises a smart card.

11. A method, for executing a program on a resource-constrained device, comprising:
   determining, on said resource constrained device, a current instruction set, a current data stack pointer, and a current program counter based at least in part on an instruction execution mode,
   wherein said current instruction set comprises one of an unrestricted instruction set and a restricted instruction set, and
   wherein said restricted instruction set and said unrestricted instruction set comprise a shared instruction subset, said shared instruction subset comprising at least one instruction shared between said restricted instruction set and said unrestricted instruction set, each instruction in a shared instruction subset having the same instruction coding for said restricted instruction set and said unrestricted instruction set;
   fetching, on said resource constrained device, a current instruction from said current instruction set, said current instruction referenced by said current program counter;
   executing, on said resource constrained device, said current instruction;
   said current data stack pointer comprises an unrestricted data stack pointer and a restricted data stack pointer;
   said current program counter comprises an unrestricted program counter and a restricted program counter;
   obtaining an instruction implementation corresponding to said current instruction and executing said instruction implementation, wherein executing said instruction implementation further comprises executing said instruction implementation if a sufficient number of fields for said current instruction are present on a data stack referenced by said current data stack pointer, and advancing said current program counter; and
   wherein unrestricted portion of said data stack is delineated by a hard data stack bottom pointer and a shared current data stack bottom pointer, and a restricted portion of said data stack is delineated by said shared current data stack bottom pointer and a top data stack pointer.

12. The method of claim 11 wherein said instruction execution mode is based at least in part on an identification of a memory zone that comprises said current instruction.

13. The method of claim 11 wherein said executing said instruction implementation further comprises executing said instruction implementation if said instruction implementation is configured to switch said instruction execution mode from a restricted instruction execution mode to an unrestricted instruction execution mode, and if an address of said current instruction is found in an unrestricted entry point list.

14. A program storage device readable by a machine, embodying a program of instructions executable by a resource-constrained device, wherein execution of the program on the resource-constrained device generates a method comprising:
   determining a current instruction set, a current data stack pointer, and a current program counter based at least in part on an instruction execution mode,
   wherein said current instruction set comprises one of an unrestricted instruction set and a restricted instruction set, and
   wherein said restricted instruction set and said unrestricted instruction set comprise a shared instruction subset, said shared instruction subset comprising at least one instruction shared between said restricted instruction set and said unrestricted instruction set, each instruction in a shared instruction subset having the same instruction coding for said restricted instruction set and said unrestricted instruction set;
   fetching a current instruction from said current instruction set, said current instruction referenced by said current program counter;
   executing said current instruction;
   said current data stack pointer comprises an unrestricted data stack pointer and a restricted data stack pointer;
   said current program counter comprises an unrestricted program counter and a restricted program counter;
   obtaining an instruction implementation corresponding to said current instruction and executing said instruction implementation, wherein executing said instruction implementation further comprises executing said instruction implementation if a sufficient number of fields for said current instruction are present on a data stack referenced by said current data stack pointer, and advancing said current program counter; and
   wherein unrestricted portion of said data stack is delineated by a hard data stack bottom pointer and a shared current data stack bottom pointer, and a restricted portion of said data stack is delineated by said shared current data stack bottom pointer and a top data stack pointer.

15. A resource-constrained device comprising:
   a processor configured to execute a plurality of instruction streams, each of said plurality of instruction streams comprising a plurality of instructions comprising an opcode and zero or more operands, each of said plurality of instruction streams associated with one of a plurality of instruction execution modes having an instruction set comprising a plurality of instruction implementations, at least one of said plurality of instruction implementations configured to change said processor from a first instruction execution mode to a second instruction execution mode, said processor comprising an instruction fetcher configured to fetch an instruction from one of said plurality of instruction streams based at least in part upon a current value of an instruction execution mode indicator; and at least one memory storing instruction data associated with said plurality of instruction streams,
wherein said instruction data comprises said current value of said instruction execution mode indicator and at least one data stack, and
wherein said at least one data stack comprises:
a single interleaved data stack further comprising:
an unrestricted portion; and
a restricted portion,
wherein said unrestricted portion is for use as a data stack by an unrestricted instruction stream executing in an unrestricted instruction execution mode; and
said restricted portion is for use as a data stack by one or more restricted instruction streams executing in a restricted instruction execution mode, one or more portions of said unrestricted portion interleaved with one or more portions of said restricted portion for nested calls between said unrestricted instruction execution mode and said restricted instruction execution mode.

16. A method, for executing a program on a resource-constrained device, comprising:
determining, on said resource constrained device, a current instruction set, a current data stack pointer, and a current program counter based at least in part on an instruction execution mode,
wherein said instruction execution mode is based at least in part on an identification of a memory zone that comprises a current instruction,
said current instruction set comprises one of an unrestricted instruction set and a restricted instruction set;
said current data stack pointer comprises one of an unrestricted data stack pointer and a restricted data stack pointer; and
said current program counter comprises one of an unrestricted program counter and a restricted program counter;
fetching, on said resource constrained device, said current instruction from said current instruction set, said current instruction referenced by said current program counter; and
executing, on said resource constrained device, said current instruction,
wherein said executing said current instruction further comprises executing an instruction implementation of said current instruction if said instruction implementation is configured to switch said instruction execution mode from a restricted instruction execution mode to an unrestricted instruction execution mode, and if an address of said current instruction is found in an unrestricted entry point list.

* * * * *